US010641630B2

(12) United States Patent
Miki et al.

(10) Patent No.: US 10,641,630 B2
(45) Date of Patent: May 5, 2020

(54) PHYSICAL QUANTITY DETECTION DEVICE

(71) Applicant: HITACHI AUTOMOTIVE SYSTEMS, LTD., Ibaraki (JP)

(72) Inventors: Takahiro Miki, Hitachinaka (JP); Hiroaki Hoshika, Hitachinaka (JP); Naoki Saito, Hitachinaka (JP); Takayuki Yogo, Hitachinaka (JP); Takeo Hosokawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 193 days.

(21) Appl. No.: 15/763,756

(22) PCT Filed: Aug. 3, 2016

(86) PCT No.: PCT/JP2016/072717
§ 371 (c)(1),
(2) Date: Mar. 27, 2018

(87) PCT Pub. No.: WO2017/056699
PCT Pub. Date: Apr. 6, 2017

(65) Prior Publication Data
US 2018/0283918 A1 Oct. 4, 2018

(30) Foreign Application Priority Data

Sep. 30, 2015 (JP) ................................. 2015-192532

(51) Int. Cl.
*G01F 1/684* (2006.01)
*G01F 1/68* (2006.01)
(Continued)

(52) U.S. Cl.
CPC ............... *G01F 1/684* (2013.01); *G01F 1/68* (2013.01); *G01F 1/6842* (2013.01); *G01F 5/00* (2013.01); *G01F 15/12* (2013.01)

(58) Field of Classification Search
CPC .......... G01F 1/684; G01F 1/68; G01F 1/6842; G01F 5/00; G01F 15/12
See application file for complete search history.

(56) References Cited

U.S. PATENT DOCUMENTS

| 4,914,947 A | 4/1990 | Davidson |
| 6,332,356 B1 * | 12/2001 | Hecht .................. G01F 1/6842 73/202.5 |

(Continued)

FOREIGN PATENT DOCUMENTS

| DE | 19815654 A1 | 10/1999 |
| DE | 10154253 A1 | 5/2003 |

(Continued)

OTHER PUBLICATIONS

Information Offer Form Submitted by Third Party on Offering of Information for the Corresponding Japanese Patent Application No. 2017-542982 to the Japanese Patent Office on May 22, 2019 with Machine Translation.

(Continued)

*Primary Examiner* — Freddie Kirkland, III
(74) *Attorney, Agent, or Firm* — Volpe and Koenig, P.C.

(57) ABSTRACT

The purpose is to enhance the measurement stability of a flow rate detection unit in a physical quantity detection device by branching an auxiliary passage in which the flow rate detection unit is disposed into first to third passages and providing the third flow passage at an upstream part of the second flow passage. A physical quantity detection device has a circuit board provided with at least one detection unit for detecting the physical quantity of a gas flowing through a main passage and a circuit unit for computational process- (Continued)

ing of the physical quantity detected by the detection unit, a housing for accommodating the circuit board, a cover fixed to the housing, and an auxiliary passage formed by both the housing and cover that is configured to branch passages from a first passage to a third passage.

7 Claims, 40 Drawing Sheets

(51) Int. Cl.
*G01F 5/00* (2006.01)
*G01F 15/12* (2006.01)

(56) References Cited

U.S. PATENT DOCUMENTS

| | | | | |
|---|---|---|---|---|
| 6,526,822 | B1* | 3/2003 | Maeda | G01F 1/6842 73/204.21 |
| 6,571,621 | B2* | 6/2003 | Watanabe | G01F 1/6842 73/202.5 |
| 7,089,788 | B2* | 8/2006 | Yonezawa | G01F 1/6842 73/114.32 |
| 7,654,134 | B2* | 2/2010 | Enomoto | G01F 1/6842 73/114.32 |
| 8,205,493 | B2* | 6/2012 | Mais | G01F 1/6842 73/202.5 |
| 8,978,455 | B2* | 3/2015 | Mais | F02D 41/18 73/114.32 |
| 9,217,655 | B2* | 12/2015 | Briese | G01F 1/684 |
| 9,618,373 | B2* | 4/2017 | Mais | G01F 1/6842 |
| 9,752,910 | B2* | 9/2017 | Wagner | G01F 1/692 |
| 10,184,817 | B2* | 1/2019 | Mais | G01F 1/6842 |
| 2003/0046977 | A1 | 3/2003 | Lenzing et al. | |
| 2003/0159501 | A1* | 8/2003 | Renninger | G01F 1/6842 73/114.33 |
| 2005/0097947 | A1* | 5/2005 | Yonezawa | G01F 1/6842 73/114.35 |
| 2005/0188760 | A1* | 9/2005 | Fujiwara | G01F 1/6842 73/202.5 |
| 2009/0078039 | A1* | 3/2009 | Ueda | G01F 1/6842 73/202 |
| 2010/0095753 | A1* | 4/2010 | Enomoto | G01F 1/6842 73/114.32 |
| 2010/0294029 | A1 | 11/2010 | Gmelin et al. | |
| 2013/0019675 | A1 | 1/2013 | Ban et al. | |
| 2013/0283895 | A1 | 10/2013 | Etherington et al. | |
| 2015/0122011 | A1 | 5/2015 | Morino et al. | |
| 2017/0261359 | A1* | 9/2017 | Briese | G01F 1/684 |
| 2017/0328753 | A1* | 11/2017 | Briese | G01F 1/6842 |
| 2018/0188087 | A1* | 7/2018 | Briese | G01F 1/6842 |

FOREIGN PATENT DOCUMENTS

| | | |
|---|---|---|
| DE | 10230531 A1 | 1/2004 |
| DE | 10253970 A1 | 6/2004 |
| DE | 10316450 A1 | 10/2004 |
| DE | 102004022271 A1 | 2/2005 |
| DE | 102007019282 A1 | 11/2008 |
| DE | 102008042164 A1 | 3/2010 |
| DE | 102008042166 A1 | 3/2010 |
| DE | 102008049843 A1 | 7/2010 |
| DE | 102010028388 A1 | 11/2010 |
| DE | 102011077682 A1 | 12/2012 |
| EP | 0369592 A2 | 5/1990 |
| EP | 1091195 A1 | 4/2001 |
| EP | 1568999 A2 | 8/2005 |
| EP | 1879004 A1 | 1/2008 |
| JP | 2002-506528 A | 2/2002 |
| JP | 2008-197122 A | 8/2008 |
| JP | 5167343 A | 12/2012 |
| JP | 2013-190447 A | 9/2013 |

OTHER PUBLICATIONS

International Search Report for WO 2017/06699 AI, dated Nov. 22, 2016.
Communication Pursuant to Rule 114(2) EPC dated Nov. 13, 2018 for the European Patent Application No. 16850876.0.
Extended European Search Report dated May 21, 2019 for the European Patent Application No. 16850876.0.
Communication pursuant to Rule 114(2) EPC dated Mar. 21, 2019 for the European Patent Application No. 16850876.0.
Communication pursuant to Rule 114(2) EPC dated Sep. 19, 2018 for the European Patent Application No. 16850876.0.

* cited by examiner (a)

(b)

CROSS SECTION OF LINE B-B

CROSS SECTION OF LINE B-B

CROSS SECTION OF LINE C-C (a)

(b)

(a)

(b)

(a)

(b)

(a) BEFORE CUTTING (b) AFTER CUTTING (a)

FLOW VELOCITY (m/s)
0.00000  13.000  26.000  39.000  52.000  65.000

(b)

(a)

(b)

PHYSICAL QUANTITY DETECTION DEVICE

TECHNICAL FIELD

The present invention relates to a sensor device for physical quantities for intake air of an internal combustion engine.

BACKGROUND ART

PTL 1 discusses a structure of a device for measuring a flow rate of the air taken into an internal combustion engine. An air flow rate measurement device has a bypass passage for bypassing a flow of the main passage and a guide surface for changing a direction of the air flow to an inlet portion of the bypass passage.

CITATION LIST

Patent Literature

PTL 1: JP 5167343 B2

SUMMARY OF INVENTION

Technical Problem

When measurement is performed by bypassing the air of the main passage such as an air flow rate sensor device and disposing a flow rate sensor element inside the bypass passage, it is necessary to perform design considering influence of a water droplet or a foreign object contained in the air flowing through the main passage. When a water droplet is attached to a surface of the flow rate sensor element, an instant output fluctuation is generated, and this generates a measurement error. In PTL 1, an air guide surface is provided in an inlet of the bypass passage in order to prevent a water droplet or a foreign object from intruding to a measurement passage bifurcated to the flow rate sensor element. However, if a flow of the main passage has a low flow rate or a middle flow rate, the inertia of the air is weak. Therefore, the water droplet or the like is attached to a wall surface, flows through a bifurcation area of the measurement passage, and arrives at the flow rate sensor element. In particular, in the technique of PTL 1, the water droplet attached to an inner or outer peripheral surface of the measurement passage may form a liquid film and arrive at the flow rate sensor element as the flow rate changes.

In view of the aforementioned problems, the present invention provides a sensor device for physical quantities having a flow rate sensor element in a bypass passage having a curvature, capable of discharging a water droplet moving along an inner or outer circumferential surface of the bypass passage to the main passage and reducing a output fluctuation of the flow rate sensor element caused when the water droplet is attached.

Solution to Problem

In order to address the aforementioned problems, the sensor device for physical quantities according to the invention is a physical quantity measurement device including an element for detecting a flow rate of the measured gas passing through a main passage, a housing where the element is mounted and a bypass passage groove for allowing the measured gas to bypass the main passage, and a cover. The groove of the housing and the cover cooperate with each other to form the bypass passage, and the bypass passage has a first passage extending straightly from the inlet, a second passage bifurcated from the first passage, and a third passage bifurcated from the second passage.

Advantageous Effects of Invention

According to the invention, a water droplet entering the bypass passage is guided to the third passage via the bifurcation area between the first and second passages, and is discharged to the main passage from the third passage. Therefore, it is possible to suppress a water droplet from arriving at the flow rate sensor element and improve a measurement error in the flow rate detection. Note that other problems, configurations, and effects than those described above will become apparent by reading the following embodiments.

BRIEF DESCRIPTION OF DRAWINGS

FIG. 2-1 is a front view illustrating a sensor device for physical quantities.

FIG. 2-2 is a rear view illustrating the sensor device for physical quantities.

FIG. 2-3 is a left side view illustrating the sensor device for physical quantities.

FIG. 2-4 is a right side view illustrating the sensor device for physical quantities.

FIG. 2-5 is a top plan view illustrating the sensor device for physical quantities.

FIG. 2-6 is a bottom view illustrating the sensor device for physical quantities.

FIG. 3-1 is a front view illustrating a state in which a front side cover is removed from the sensor device for physical quantities.

FIG. 3-2 is a rear view illustrating a state in which a back side cover is removed from the sensor device for physical quantities.

FIG. 3-3 is a left side view illustrating a state in which the exterior and back side covers are removed from the sensor device for physical quantities.

FIG. 3-4 is a right side view illustrating a state in which the exterior and back side covers are removed from the sensor device for physical quantities.

FIG. 3-5 is a cross-sectional view taken along a line A-A of FIG. 3-1.

FIG. 4-1 is a rear view for describing another embodiment of the housing.

FIG. 4-2 is a right side view illustrating the housing of FIG. 4-1.

FIG. 5 is a diagram illustrating a configuration of a front side cover.

FIG. 6 is a diagram illustrating a configuration of a back side cover.

FIG. 7-1 is a front view illustrating a printed circuit board (PWB).

FIG. 7-2 is a right side view illustrating the printed circuit board.

FIG. 7-3 is a rear view illustrating the printed circuit board.

FIG. 7-4 is a left side view illustrating the printed circuit board.

FIG. 7-5 is a cross-sectional view taken along a line B-B of FIG. 7-1.

FIG. 7-6 is a diagram illustrating another embodiment of the cross section taken along the line B-B of FIG. 7-1.

FIG. 7-7 is a cross-sectional view taken along a line C-C of FIG. 7-1.

FIG. 8-1 is a diagram illustrating a structure of a sensor room, in which FIG. 8-1(*a*) is an enlarged view of the sensor room, and FIG. 8-1(*b*) is a cross-sectional view taken along a line E1-E1 of FIG. 8-1(*a*).

FIG. 8-2 is a diagram illustrating a structure of another embodiment of the sensor room, in which FIG. 8-2(*a*) is an enlarged view of the sensor room, and FIG. 8-2(*b*) is a cross-sectional view taken along a line E2-E2 of FIG. 8-2(*a*).

FIG. 8-3 is a diagram illustrating a structure of further another embodiment of the sensor room, in which FIG. 8-3(*a*) is an enlarged view of the sensor room, and FIG. 8-3(*b*) is a cross-sectional view taken along a line E3-E3 of FIG. 8-3(*a*).

FIG. 9-1 is a diagram illustrating a structure of a terminal connection portion.

FIG. 9-2 is a diagram illustrating a structure of the terminal connection portion.

FIG. 9-3 is a cross-sectional view taken along a line F-F of FIG. 9-1.

FIG. 9-4 is a cross-sectional view taken along a line G-G of FIG. 9-2.

FIG. 10-1 is a diagram illustrating an example of a circuit configuration of the sensor device for physical quantities.

FIG. 10-2 is a diagram illustrating another embodiment of the circuit configuration of the sensor device for physical quantities.

FIG. 11-1 is a rear view illustrating another embodiment of the state in which the back side cover is removed from the physical quantity measurement device.

FIG. 11-2(*a*) is a rear view illustrating the physical quantity measurement device of FIG. 11-1, and FIG. 11-2(*b*) is a cross-sectional view taken along a line J-J of FIG. 11-2(*a*).

FIG. 11-3(*a*) is an enlarged view of a dotted line portion AA of FIG. 11-1, and FIG. 11-3(*b*) illustrates an embodiment of a flow analysis illustrating a flow velocity profile inside the bypass passage indicated in FIG. 11-3(*a*).

FIG. 11-4(*a*) is a diagram illustrating a flow analysis example illustrating a flow velocity profile on a cross section of the air flow direction in a physical quantity measurement device, and FIG. 11-4(*b*) is a diagram illustrating a relationship between a flow velocity of the main passage and a flow rate flowing from the drainage hole.

FIG. 11-5 is a diagram illustrating another embodiment of the physical measurement device of FIG. 11-1.

FIG. 11-6(*a*) is a rear view illustrating the physical measurement device of FIG. 11-5, and FIG. 11-6(*b*) is a cross-sectional view taken along a line K-K of FIG. 11-6(*a*).

FIG. 11-7 illustrates a flow analysis example for the flow velocity profile illustrated in the cross-sectional view of FIG. 11-6(*b*).

FIG. 11-8 is a diagram illustrating another embodiment of the physical quantity measurement device of FIG. 11-1.

DESCRIPTION OF EMBODIMENTS

Figure 1:
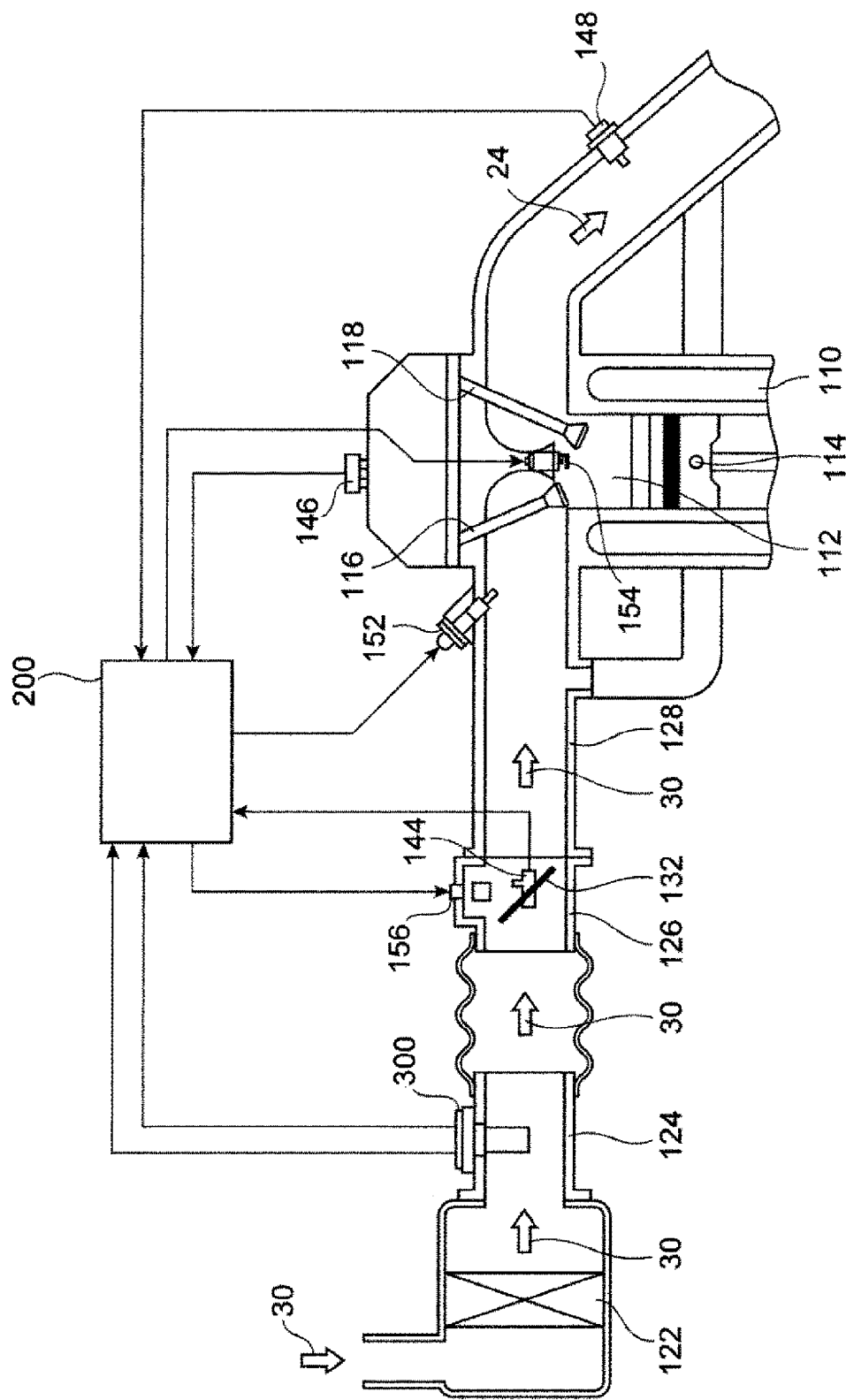
FIG. 1 is a system diagram illustrating an embodiment in which a sensor device for physical quantities according to the present invention is applied to an internal combustion engine control system.

The following embodiments for embodying the invention (hereinafter, referred to as "embodiments") address various problems desired as an actual product. In particular, when they are employed in a sensor device for detecting a physical quantity of a vehicle intake air, various problems are preferably addressed, and various effects are achieved. One of the various problems addressed by the embodiments as described below is described in "Technical Problem." In addition, one of the following various effects of the embodiments is described in "Advantageous Effects of invention." Various problems addressed by the following embodiments and various effects accomplished by the following embodiments will be more specifically described below in "Description of Embodiments." Therefore, the problems addressed by the embodiments or effects of the invention described in the following embodiments are also described in other parts than "Technical Problem" or "Advantageous Effects of Invention."

In the following embodiment, like reference numerals denote like elements throughout the drawings, and they accomplish the same functional effects. Some parts that have been described may not be described just by giving reference numerals in the drawings.

1. Embodiment in Which a Sensor Device for Physical Quantities According to the Invention is Employed in an Internal Combustion Engine Control System FIG. 1 is a system diagram illustrating an embodiment in which a sensor device for physical quantities according to the invention is employed in an electronic fuel injection type internal combustion engine control system. An intake air as a measured gas 30 is drawn from an air cleaner 122 on the basis of an operation of an internal combustion engine 110 provided with an engine cylinder 112 and an engine piston 114, and is guided to a combustion chamber of the engine cylinder 112 via a main passage 124 including, for example, an intake body, a throttle body 126, and an intake manifold 128. A physical quantity of the measured gas 30 which is the intake air guided to the combustion chamber is detected by a sensor device for physical quantities 300 according to the invention. Fuel is supplied from a fuel injection valve 152 on the basis of the detected physical quantity, and is guided to the combustion chamber in a gas mixture state along with the intake air 20. Note that, according to this embodiment, the fuel injection valve 152 is provided in an intake port of the internal combustion engine, and the fuel injected to the intake port forms a gas mixture along with the measured gas 30 which is the intake air. The gas mixture is guided to the combustion chamber via the intake valve 116 and is combusted to generate mechanical energy.

The fuel and the air guided to the combustion chamber have a fuel/air mixture state and are explosively combusted by flame ignition of an ignition plug 154 to generate mechanical energy. The combusted gas is guided from the exhaust valve 118 to the exhaust pipe and is discharged to the outside from an exhaust pipe as an exhaust gas 24. A flow rate of the measured gas 30 which is the intake air guided to the combustion chamber is controlled by a throttle valve 132 having an opening level that changes depending on a manipulation of an acceleration pedal. The fuel supply amount is controlled on the basis of the flow rate of the intake air guided to the combustion chamber. A driver controls the flow rate of the intake air guided to the combustion chamber by controlling the opening level of the throttle valve 132. As a result, it is possible to control mechanical energy generated by the internal combustion engine.

1.1 Overview of Control of Internal Combustion Engine Control System

Physical quantities such as a flow rate, temperature, humidity, and pressure of the measured gas 30 which is the intake air drawn from the air cleaner 122 to flow through the main passage 124 are detected by the sensor device for physical quantities 300, and an electric signal representing the physical quantities of the intake air is input to the control device 200 from the sensor device for physical quantities 300. In addition, an output of a throttle angle sensor 144 that measures an opening level of the throttle valve 132 is input to the control device 200, and an output of the rotation angle sensor 146 is input to a control device 200 in order to measure a position or state of the engine piston 114, the intake valve 116, or the exhaust valve 118 of the internal combustion engine and a rotation speed of the internal combustion engine. In order to measure a state of mixture ratio of amount of fuel and air from the exhaust gas 24, an output of the oxygen sensor 148 is input to the control device 200.

The control device 200 computes a fuel injection amount or an ignition timing on the basis of physical quantities of the intake air as an output of the sensor device for physical quantities 300 and a rotation speed of the internal combustion engine measured on the basis of an output of the rotation angle sensor 146. A fuel amount supplied from the fuel injection valve 152 or an ignition timing of the ignition plug 154 is controlled on the basis of the computation result. In practice, the fuel supply amount or the ignition timing is accurately controlled on the basis of a temperature detected by the sensor device for physical quantities 300, a throttle angle change state, an engine rotational speed change state, and an air-fuel ratio state measured by the oxygen sensor 148. The control device 200 controls the amount of air bypassing the throttle valve 132 in an idle driving state of the internal combustion engine using an idle air control valve 156 to control a rotation speed of the internal combustion engine in the idle driving state.

1.2 Importance of Improvement of Detection Accuracy of Sensor Device for Physical Quantities and Installation Environment of Sensor Device for Physical Quantities The fuel supply amount or the ignition timing as a main control quantity of the internal combustion engine is computed by setting the output of the sensor device for physical quantities 300 as a main parameter. Therefore, it is important to improve detection accuracy of the sensor device for physical quantities 300, suppress aging, and improve reliability in order to improve vehicle control accuracy and secure reliability.

In particular, in recent years, vehicle fuel efficiency is highly demanded, and purification of the exhaust gas is also highly demanded. In order to satisfy such demands, it is significantly important to improve detection accuracy of the physical quantities of the intake air 20 detected by the sensor device for physical quantities 300. In addition, it is also important that the sensor device for physical quantities 300 maintains high reliability.

A vehicle mounted with the sensor device for physical quantities 300 is operated under an environment in which a change of temperature or humidity is significant. The sensor device for physical quantities 300 is desirably designed to be resistant to a change of temperature or humidity under its use environment or a contaminant such as dust.

The sensor device for physical quantities 300 is mounted to the intake pipe which is influenced by the heat from the internal combustion engine. For this reason, the heat from the internal combustion engine is transmitted to the sensor device for physical quantities 300 through the intake pipe which is the main passage 124. The sensor device for physical quantities 300 transfers heat with the measured gas to detect a flow rate of the measured gas. Therefore, it is important to suppress influence of the heat from the outside as much as possible.

The sensor device for physical quantities 300 mounted on a vehicle addresses the problems described in "Technical Problem" and accomplishes the effect described in "Advantageous Effects of Invention" as described below. Furthermore, the sensor device for physical quantities 300 addresses various problems required as a product and accomplishes various effects by sufficiently considering the aforementioned various problems as described below. Specific problems to be addressed and specific effects accomplished by sensor device for physical quantities 300 will be described in the following embodiment.

2. Configuration of Sensor Device for Physical Quantities 300

2.1 Exterior Structure of Sensor Device for Physical Quantities 300

Figures 1, 2:
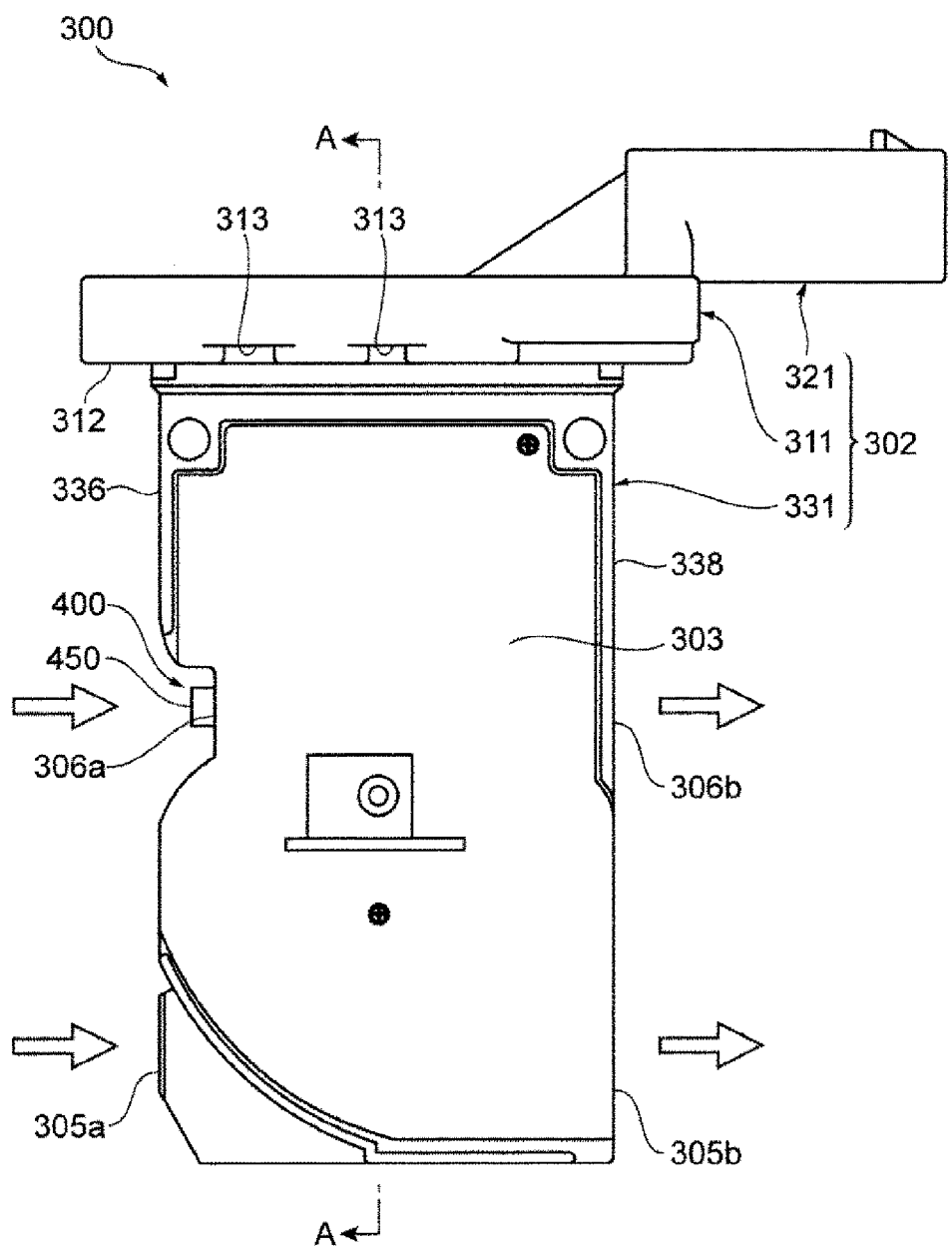
Figure 2:
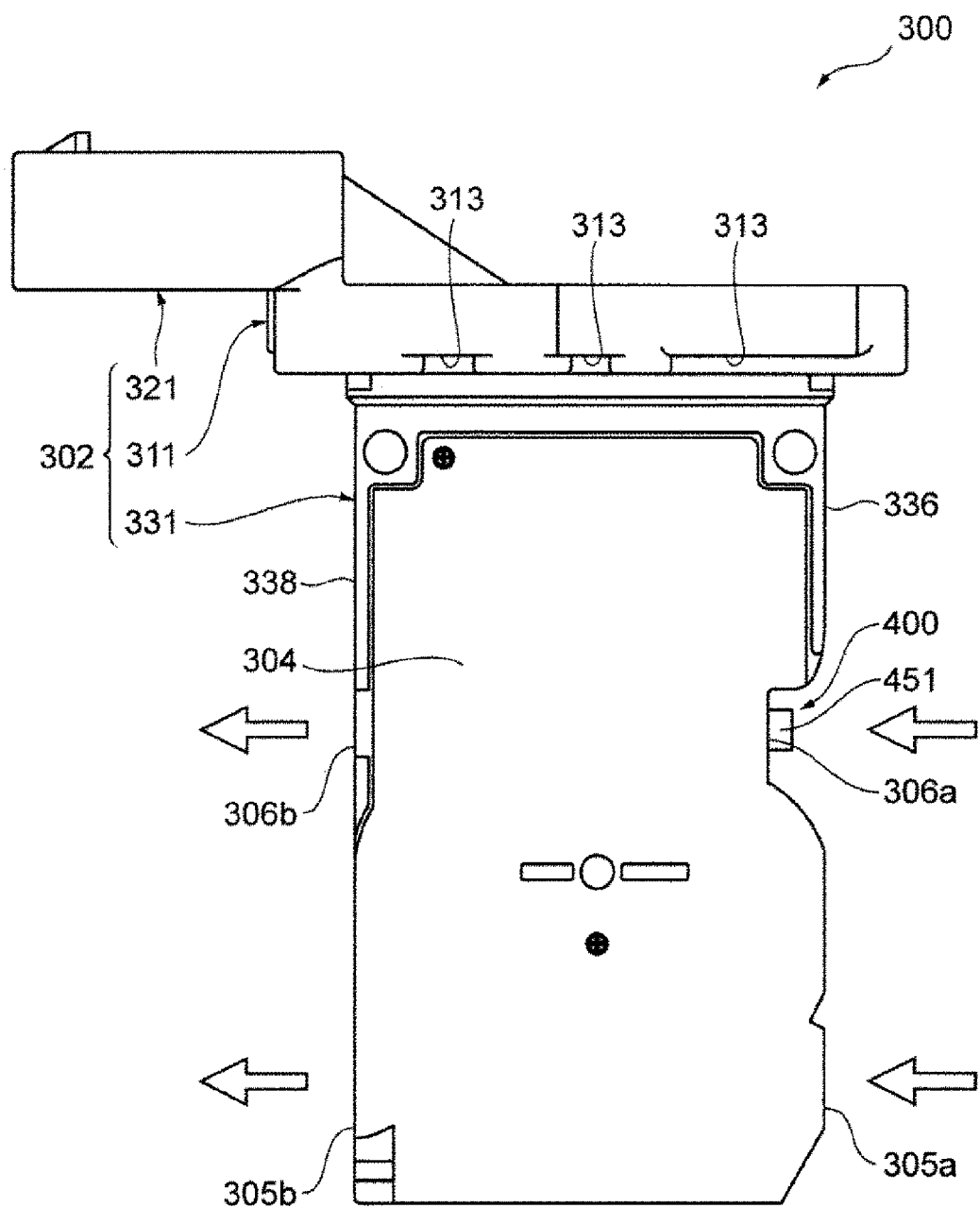
Figures 2, 3:
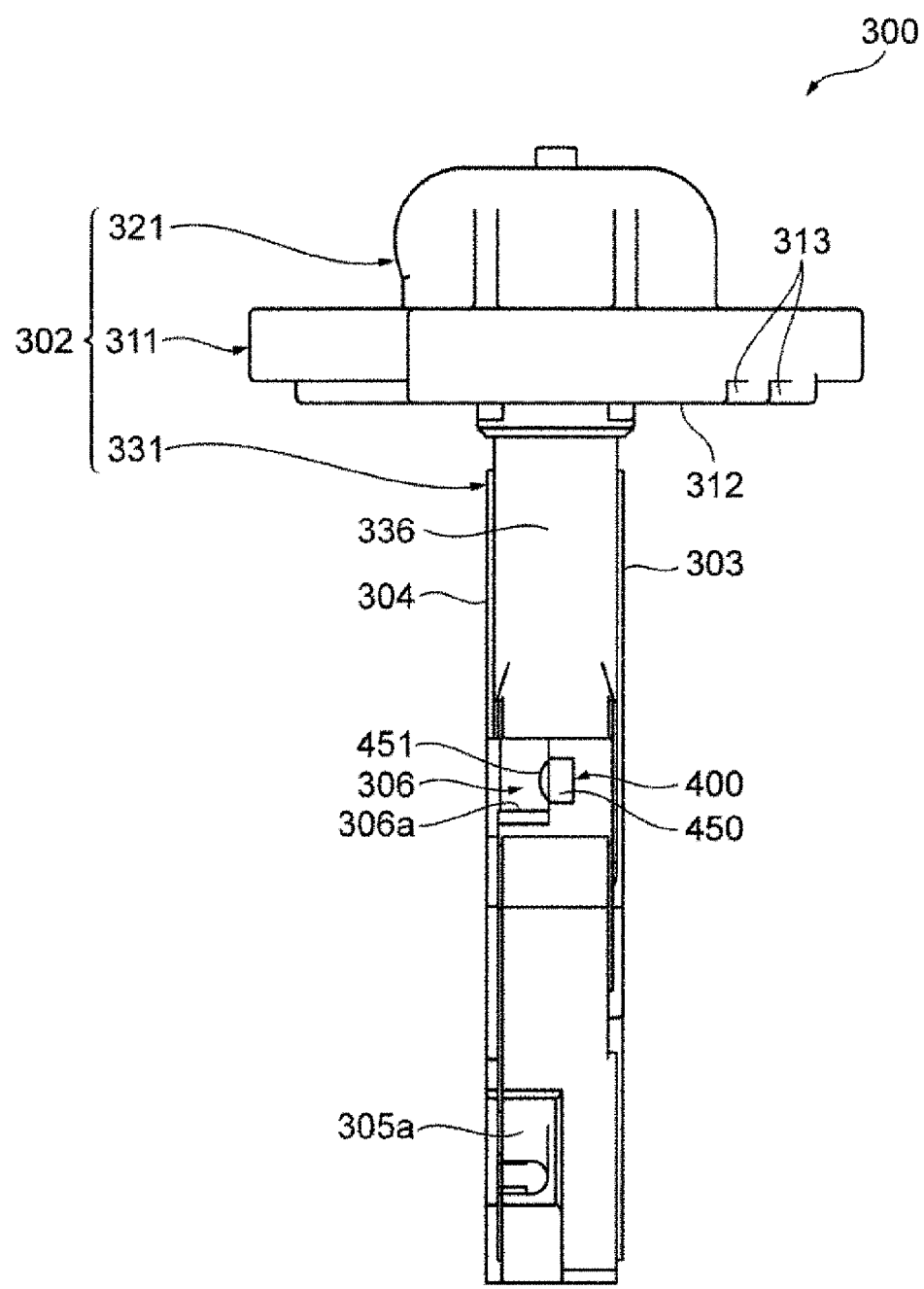
Figures 2, 3, 4:
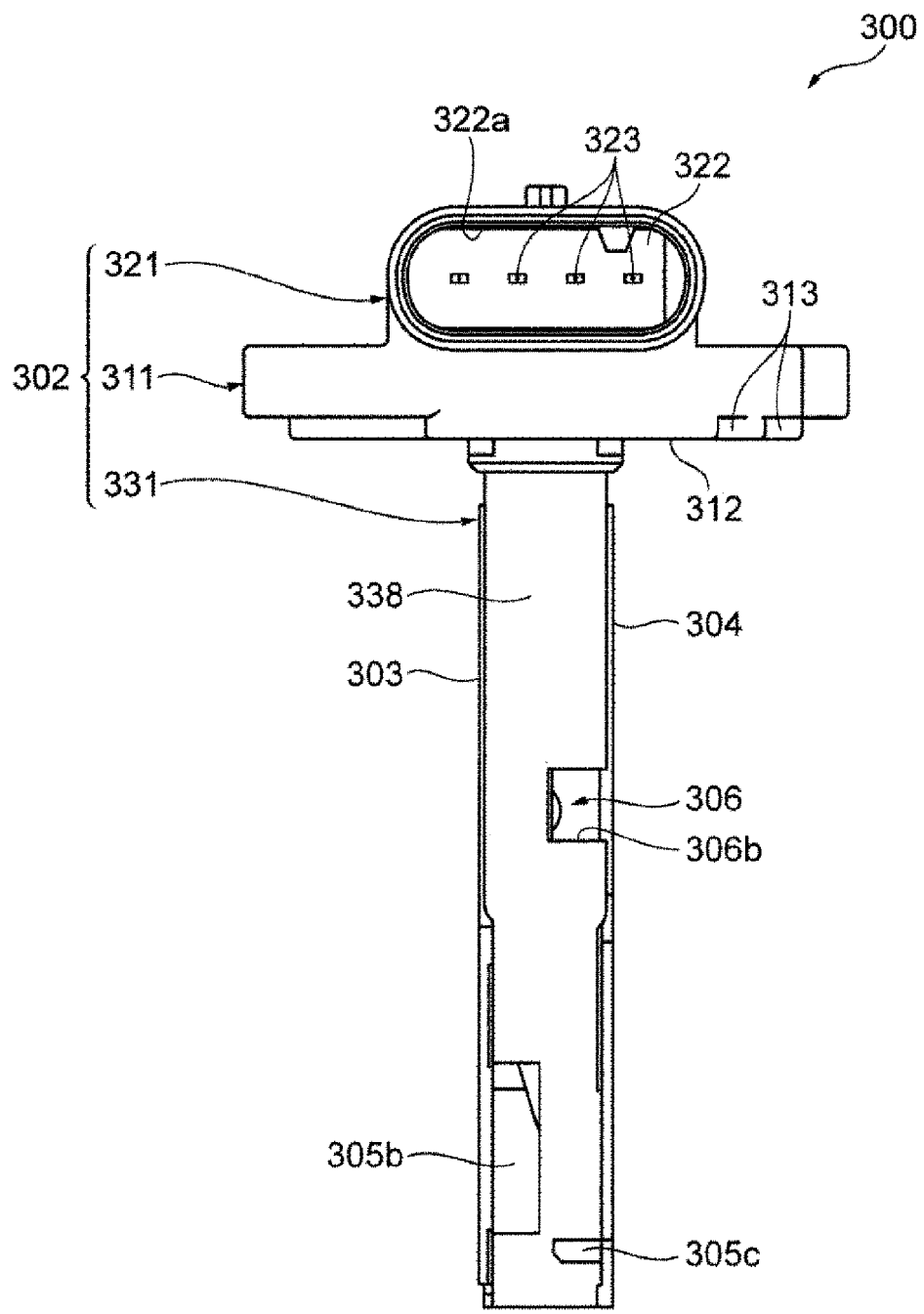

FIGS. 2-1 to 2-6 are diagrams illustrating an exterior of the sensor device for physical quantities 300. FIG. 2-1 is a front view illustrating the sensor device for physical quantities 300, FIG. 2-2 is a rear view, FIG. 2-3 is a left side view, FIG. 2-4 is a right side view, FIG. 2-5 is a top plan view, and FIG. 2-6 is a bottom view.

The sensor device for physical quantities 300 has a housing 302, a front side cover 303, and a back side cover 304. The housing 302 is formed by molding with a synthetic resin material. The housing 302 has a flange 311 for fixing the sensor device for physical quantities 300 to the intake body which is the main passage 124, a connection to external system 321 provided with a connector protruding from the flange 311 for electric connection to an external device, and a measurement portion 331 extending to protrude toward a center of the main passage 124 from the flange 311.

A printed circuit board (PWB) 400 is integrated to the measurement portion 331 through insert molding when the housing 302 is molded (refer to FIGS. 3-1 and 3-2). The printed circuit board (PWB) 400 is provided with at least one detection portion for detecting physical quantities of the measured gas 30 flowing through the main passage 124 and a circuit portion for processing the signal detected by the detection portion. The detection portion is arranged in a position exposed to the measured gas 30, and the circuit portion is arranged in a circuit room sealed by the front side cover 303.

A bypass passage Groove is provided in the front and back sides of the measurement portion 331, so that a first bypass passage 305 is formed in cooperation with the front side cover 303 and the back side cover 304. In a tip of the measurement portion 331, an inlet of first bypass passage 305*a* is provided to draw apart of the measured gas 30 such as the intake air to the first bypass passage 305 and an outlet of first bypass passage 305*b* for returning the measured gas 30 to the main passage 124 from the first bypass passage 305 are provided. In the middle of the first bypass passage 305, a part of the printed circuit board (PWB) 400 is exposed. In this exposed portion, a detection area of air flow 602 (refer to FIG. 3-1) as a detection portion is arranged to detect a flow rate of the measured gas 30.

A second bypass passage 306 for drawing a part of the measured gas 30 such as the intake air to a sensor room Rs is provided in the middle of the measurement portion 331 in the vicinity of the flange 311 rather than the first bypass passage 305. The second bypass passage 306 is formed in cooperation with the measurement portion 331 and the back side cover 304. The second bypass passage 306 has an inlet of second bypass passage 306a opened to an outer wall at upstream 336 in order to receive the measured gas 30 and an outlet of second bypass passage 306b opened to an outer wall at downstream 338 to return the measured gas 30 to the main passage 124 from the second bypass passage 306. The second bypass passage 306 communicates with the sensor room Rs formed in the back side of the measurement portion 331. In the sensor room Rs, a pressure sensor and a humidity sensor are disposed as a detection portion provided in the back side of the printed circuit board (PWB) 400.

2.2 Effects Based on Exterior Structure of Sensor Device for Physical Quantities 300

The sensor device for physical quantities 300 is provided with an inlet of second bypass passage 306a in the middle of the measurement portion 331 extending to the center of the main passage 124 from the flange 311, and an inlet of first bypass passage 305a is provided in a tip of the measurement portion 331. Therefore, the gas in a portion close to the center far from the inner wall surface instead of the vicinity of the inner wall surface of the main passage 124 can be drawn to the first bypass passage 305 and the second bypass passage 306. Therefore, the sensor device for physical quantities 300 can measure the physical quantities of the gas in a part distant from the inner wall surface of the main passage 124. Therefore, it is possible to reduce a measurement error in the physical quantities relating to heat or reduction of the flow velocity in the vicinity of the inner wall surface.

The measurement portion 331 is shaped to extend along an axis directed from the outer wall of the main passage 124 to the center. However, its thickness width is narrow as illustrated in FIGS. 2-3 and 2-4. That is, the measurement portion 331 of the sensor device for physical quantities 300 has a thin width in a side view and a substantially rectangular shape in a front view. As a result, the sensor device for physical quantities 300 can be provided with the first bypass passage 305 having a sufficient length and can suppress a flow resistance of the measured gas 30 to a small value. For this reason, the sensor device for physical quantities 300 can suppress the flow resistance to a small value and measure the flow rate of the measured gas 30 with high accuracy.

2.3 Structure and Effect of Flange 311

The flange 311 provided with a plurality of dents 313 on the opposed bottom surface 312 to the main passage 124 in order to reduce a surface for heat transfer with the main passage 124 and make the sensor device for physical quantities 300 less influenced by the heat. The measurement portion 331 of the sensor device for physical quantities 300 is inserted into the inside from an installation hole provided in the main passage 124 so that the bottom surface 312 of the flange 311 faces the main passage 124. The main passage 124 is, for example, an intake body, and the main passage 124 is maintained in a high temperature in many cases. Reversely, at the time of start in a cold district, it is conceived that the main passage 124 has a significantly low temperature. If such a high or low temperature state of the main passage 124 influences on the measurement of various physical quantities, the measurement accuracy is degraded. The flange 311 has dents 313 on its bottom surface 312, and a space is formed between the bottom surface 312 facing the main passage 124 and the main passage 124. Therefore, it is possible to reduce the heat transfer from the main passage 124 to the sensor device for physical quantities 300 and prevent degradation of measurement accuracy caused by heat.

A screw hole 314 of the flange 311 is to fix the sensor device for physical quantities 300 to the main passage 124. As a surface around the screw hole 314 facing the main passage 124 is distant from the main passage 124, a space is formed between the surface around each screw hole 314 facing the main passage 124 and the main passage 124. As a result, it is possible to reduce heat transfer from the main passage 124 to the sensor device for physical quantities 300 and prevent degradation of the measurement accuracy caused by heat.

2.4 Structure of Connection to External System 321

The connection to external system 321 is provided on the upper surface of the flange 311 and has a connector 322 protruding from the flange 311 to a downstream side of the flow direction of the measured gas 30. The connector 322 has a receptacle hole 322a for inserting a communication cable connected to the control device 200. Four external terminals 323 are provided inside the receptacle hole 322a as illustrated in FIGS. 2-4. The external terminal 323 serves as a terminal for outputting information on physical quantities as a measurement result of the sensor device for physical quantities 300 and a power terminal for supplying DC power for operating sensor device for physical quantities 300.

The connector 322 is shaped to protrude to the downstream side in the flow direction of the measured gas 30 from the flange 311 and is inserted into the upstream side from the downstream side of the flow direction. However, the connector 322 is not limited to such a shape. For example, the connector 322 may protrude vertically from the top surface of the flange 311 and may be inserted along the extension direction of the measurement portion 331. Other various changes may also be possible.

3. Whole Structure and Effect of Housing 302

3.1 Whole Structure of Housing 302

Figures 2, 3, 4, 5:
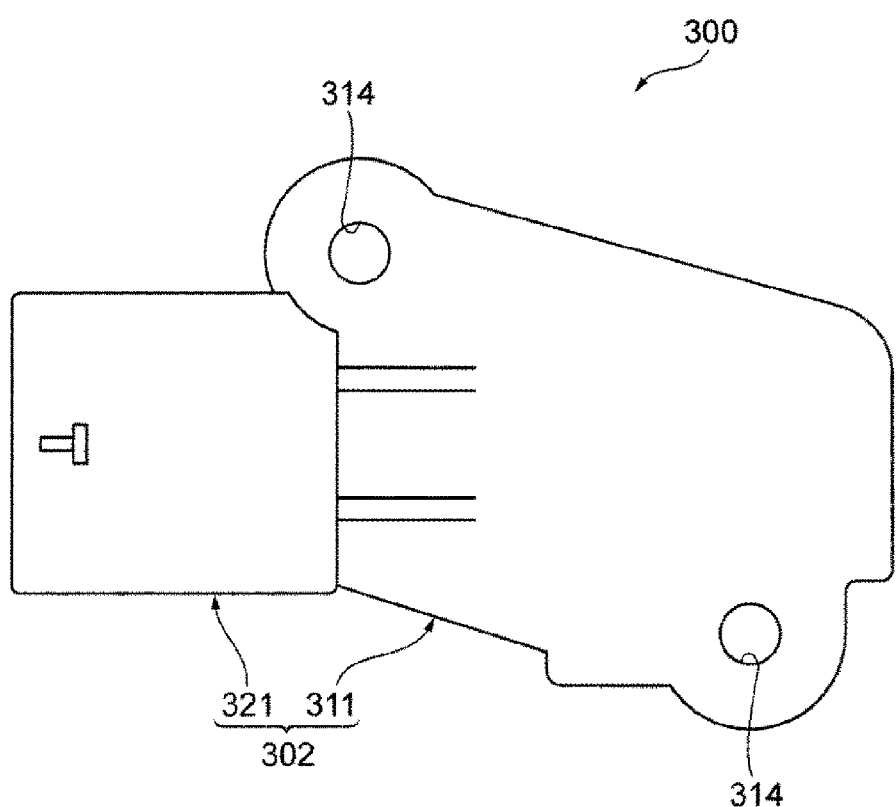

Next, a whole structure of the housing 302 will be described with reference to FIGS. 3-1 to 3-5. FIGS. 3-1 to 3-5 are diagrams illustrating a state of the housing 302 when the front side cover 303 and the back side cover 304 are removed from the sensor device for physical quantities 300. FIG. 3-1 is a front view of the housing 302, FIG. 3-2 is a rear view illustrating the housing 302, FIG. 3-3 is a right side view illustrating the housing 302, FIG. 3-4 is a left side view illustrating the housing 302, and FIG. 3-5 is a cross-sectional view taken along the line A-A of FIG. 3-1.

The housing 302 is structured such that the measurement portion 331 extends from the flange 311 to the center of the main passage 124. A printed circuit board (PWB) 400 is insert-molded in a base end side of the measurement portion 331. The printed circuit board (PWB) 400 is placed in parallel along the surface of the measurement portion 331 in a middle position between the front and back sides of the measurement portion 331 and is integrally molded to the housing 302, so that the base end side of the measurement portion 331 is partitioned into one and the other sides in the thickness direction.

On the front side of the measurement portion 331, a circuit room Rc for housing the circuit portion of the printed circuit board (PWB) 400 is formed. On the back side, a sensor room Rs for housing the pressure sensor 421 and the humidity sensor 422 is formed. As the front side cover 303 is installed in the housing 302, the circuit room Rc is sealed and perfectly separated from the outside. Meanwhile, by installing the back side cover 304 in the housing 302, a second bypass passage 306 and a sensor room Rs which is an interior space communicating with the outside of the measurement portion 331 via the second bypass passage 306 are formed. A part of the printed circuit board (PWB) 400 protrudes to the first bypass passage 305 from the partitioning wall 335 between the circuit room Rc of the measurement portion 331 and the first bypass passage 305. In addition, a detection area of air flow 602 is provided in the front surface of main air flow 430 of the protruding portion.

3.2 Structure of Bypass Passage Groove

A bypass passage groove for forming the first bypass passage 305 is provided in a tip side of the longitudinal direction of the measurement portion 331. The bypass passage groove for forming the first bypass passage 305 has a groove of bypass passage at front side 332 of FIG. 3-1 and a groove of bypass passage at back side 334 of FIG. 3-2. The groove of bypass passage at front side 332 is curved to the flange 311 side which is a base end side of the measurement portion 331 as it extends from the outlet of first bypass passage 305b opened to the outer wall at downstream 338 of the measurement portion 331 to the outer wall at upstream 336 and communicates with an aperture 333 that penetrates the measurement portion 331 in the thickness direction in the vicinity of the outer wall at upstream 336 as illustrated in FIG. 3-1. The aperture 333 is formed along the flow direction of the measured gas 30 of the main passage 124 such that it stretches between the outer wall at upstream 336 and the outer wall at downstream 338.

The groove of bypass passage at back side 334 extends from the outer wall at upstream 336 to the outer wall at downstream 338 and is bisected in the middle position between the outer wall at upstream 336 and the outer wall at downstream 338 as illustrated in FIG. 3-2. One of the branches extends straightly as a discharge passage and is opened to the discharge port 305c of the outer wall at downstream 338. The other branch is curved to the flange 311 side which is a base end side of the measurement portion 331 as it extends to the outer wall at downstream 338, and communicates with the aperture 333 in the vicinity of the outer wall at downstream 338.

The groove of bypass passage at back side 334 forms an inlet groove for receiving the measured gas 30 from the main passage 124. The groove of bypass passage at front side 332 forms an outlet groove for returning the measured gas 30 received from the groove of bypass passage at back side 334 to the main passage 124. Since the groove of bypass passage at front side 332 and the Groove of bypass passage at back side 334 are provided in the tip of the housing 302, it can receive the gas in a part distant from the inner wall surface of the main passage 124, that is, the gas flowing in a part close to the center of the main passage 124 as the measured gas 30. The gas flowing through the vicinity of the inner wall surface of the main passage 124 is influenced by the wall surface temperature of the main passage 124 and has a temperature different from an average temperature of the gas flowing through the main passage 124 such as the intake air 20 in many cases. In addition, the gas flowing through the vicinity of the inner wall surface of the main passage 124 has a flow velocity slower than an average flow velocity of the gas flowing through the main passage 124 in many cases. The sensor device for physical quantities 300 according to the embodiment is not easily influenced as described above. Therefore, it is possible to suppress degradation of the measurement accuracy.

As illustrated in FIG. 3-2, a part of the measured gas 30 flowing through the main passage 124 is directed from the inlet of first bypass passage 305a to the groove of bypass passage at back side 334 and flows through the groove of bypass passage at back side 334. In addition, a foreign object having a large mass contained in the measured gas 30 directly flows to a discharge passage extending straightly from the bifurcation along with a part of the measured gas and is discharged to the main passage 124 from the discharge port 305c of the outer wall at downstream 338.

The groove of bypass passage at back side 334 is deepened as it extends, so that the measured gas 30 slowly moves to the front side of the measurement portion 331 as it flows along the groove of bypass passage at back side 334. In particular, the groove of bypass passage at back side 334 has a rapid slope portion 334a having a slope which becomes abruptly steep in the vicinity of the aperture 333. Therefore, apart of the air having a small mass moves along the rapid slope portion 334a and flows along the front surface of main air flow 430 of the printed circuit board (PWB) 400 inside the aperture 333. Meanwhile, since it is difficult to abruptly change a route of a foreign object having a large mass, the foreign object flows along the back surface of main air flow 431.

As illustrated in FIG. 3-1, the measured gas 30 moving to the front side in the aperture 333 flows along the front surface of main air flow 430 of the printed circuit board and transfers heat with the detection area of air flow 602 provided in the front surface of main air flow 430, so that the flow rate is measured. All of the air flowing from the aperture 333 to the groove of bypass passage at front side 332 flows along the groove of bypass passage at front side 332 and is discharged to the main passage 124 from the first bypass passage outlet 305b opened to the outer wall at downstream 338.

A heavy substance such as garbage mixed in the measured gas 30 has a strong inertial force. Therefore, it is difficult to abruptly change the route into a deep groove side along a surface of the rapid slope portion 334a where the depth of the groove is abruptly large. For this reason, a heavy foreign object moves to the back surface of main air flow 431. Therefore, it is possible to prevent the foreign object from flowing in the vicinity of the detection area of air flow 602. In this embodiment, most of the heavy foreign objects other than the gas pass through the back surface of main air flow 431 which is a rear surface of the front surface of main air flow 430. Therefore, it is possible to reduce influence of dirt caused by a foreign object such as an oil content, carbon, or garbage and suppress degradation of measurement accuracy. That is, since the route of the measured gas 30 is abruptly changed along the axis crossing the flow axis of the main passage 124, it is possible to reduce influence of a foreign object mixed to the measured gas 30.

3.3 Structure and Effect of Second Bypass Passage and Sensor Room

The second bypass passage 306 is formed straightly between the inlet of second bypass passage 306a and the outlet of second bypass passage 306b in parallel with the flange 311 along the flow direction of the measured gas 30. The inlet of second bypass passage 306a is formed by notching a part of the outer wall at upstream 336, and the outlet of second bypass passage 306b is formed by notching a part of the outer wall at downstream 338. Specifically, as illustrated in FIG. 3-3, they are formed by notching a part of the outer wall at upstream 336 and a part of the outer wall at downstream 338 from the back side of the measurement portion 331 in a position continuously following the top surface of the partitioning wall 335. The inlet of second bypass passage 306a and the outlet of second bypass passage 306b are notched to a depth position coplanar with the back side of the printed circuit board (PWB) 400. In the second bypass passage 306, the measured gas 30 passes along the back side of the board body 401 of the printed circuit board (PWB) 400. Therefore, the second bypass passage 306 serves as a cooling channel for cooling the board body 401. The printed circuit board (PWB) 400 has a lot of components susceptible to heat such as a large scale integrated (LSI) chip or a microprocessor. Therefore, such heat can be transmitted to the back side of the board body 401 and is radiated using the measured gas 30 passing through the second bypass passage 306.

The sensor room Rs is provided in the base end side of the measurement portion 331 rather than the second bypass passage 306. A part of the measured gas 30 flowing from the inlet of second bypass passage 306a to the second bypass passage 306 flows to the sensor room Rs, so that a pressure and a relative humidity are detected using a pressure sensor 421 and a humidity sensor 422 of the sensor room Rs. The sensor room Rs is disposed in the base end side of the measurement portion 331 rather than the second bypass passage 306. Therefore, it is possible to reduce influence of a dynamic pressure of the measured gas 30 passing through the second bypass passage 306. Therefore, it is possible to improve detection accuracy of the pressure sensor 421 of the sensor room Rs.

Since the sensor room Rs is disposed in the base end side of the measurement portion 331 rather than the second bypass passage 306, for example, if the sensor room Rs is installed in the intake passage while a tip side of the measurement portion 331 is directed downward, it is possible to prevent a contaminant or a water droplet flowing to the second bypass passage 306 along with the measured gas 30 from being attached to the pressure sensor 421 or the humidity sensor 422 disposed downstream of the pressure sensor 421.

In particular, according to this embodiment, the pressure sensor 421 having a relatively large size is disposed in the upstream side inside the sensor room Rs, and the humidity sensor 422 having a relatively small size is disposed in the downstream side of the pressure sensor 421. Therefore, a contaminant or water droplet flowing along with the measured gas 30 is attached to the pressure sensor 421 and is suppressed from being attached to the humidity sensor 422. Therefore, it is possible to protect the humidity sensor 422 less resistant to a contaminant or a water droplet.

Since the pressure sensor 421 and the humidity sensor 422 are not easily influenced by the flow of the measured gas 30 relative to the detection area of air flow 602. In particular, the humidity sensor 422 can be provided in the sensor room Rs neighboring to the second bypass passage 306 which is straight because it is allowable as long as only a moisture dispersion level of the measured gas 30 can be obtained. In comparison, the detection area of air flow 602 necessitates a flow velocity equal to or higher than a certain level. In addition, it is necessary to avoid dust or contaminants and consider influence on pulsation. Therefore, the detection area of air flow 602 is provided in the first bypass passage 305 having a loop-like shape.

FIGS. 4-1 and 4-2 are diagrams illustrating another embodiment of the second bypass passage.

In this embodiment, instead of the notching in the outer wall at upstream 336 and the outer wall at downstream 338, a through-hole 337 is provided in the outer wall at upstream 336 and the outer wall at downstream 338 to form the inlet of second bypass passage 306a and the outlet of second bypass passage 306b. If the inlet of second bypass passage 306a and the outlet of second bypass passage 306b are formed by notching the outer wall at upstream 336 and the outer wall at downstream 338, respectively, as in the second bypass passage of FIGS. 3-2 to 3-5 described above, the width of the outer wall at upstream 336 and the width of the outer wall at downstream 338 are locally narrowed in this position. Therefore, the measurement portion 331 may be doglegged at the notch portion due to thermal shrinkage during the molding. According to this embodiment, the through-hole is provided instead of the notch. Therefore, it is possible to prevent a doglegged shape of the measurement portion 331. Accordingly, it is possible to prevent influence on detection accuracy caused when a position or direction of the detection portion with respect to the measured gas 30 is changed due to a distortion of the housing 302. Therefore, it is possible to obtain constant detection accuracy without an individual difference at all times.

FIGS. 8-1, 8-2, and 8-3 are diagrams illustrating another embodiment of the second bypass passage.

A compartment wall for dividing the second bypass passage 306 and the sensor room Rs may be provided in the back side cover 304. In this configuration, it is possible to allow the measured gas 30 to indirectly flow from the second bypass passage 306 to the sensor room Rs. Therefore, it is possible to reduce influence of a dynamic pressure on the pressure sensor and suppress a contaminant or a water droplet from being attached to humidity sensor.

Figure 8:
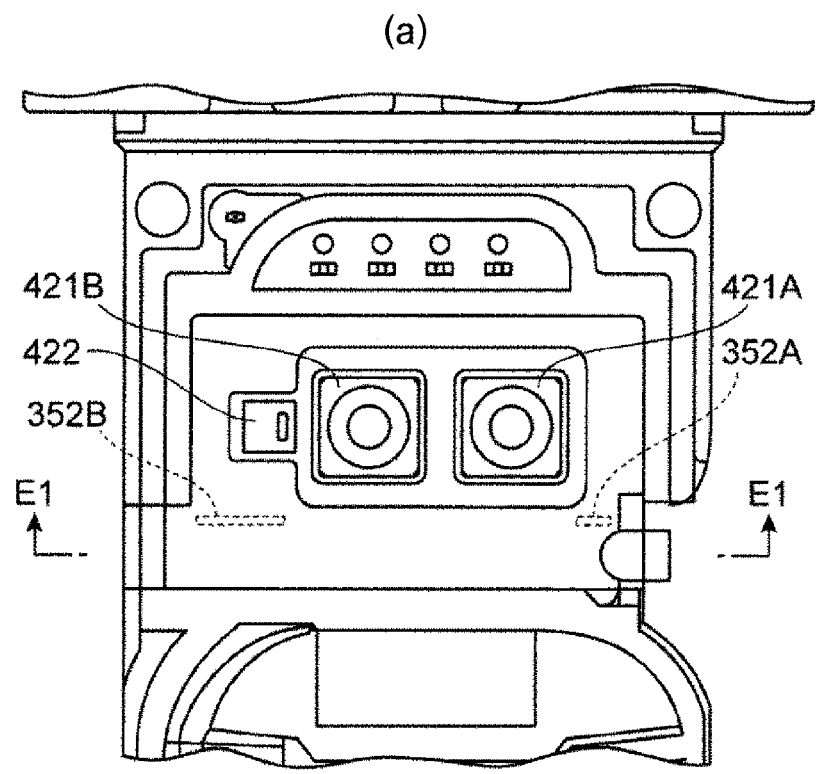
Figure 1:
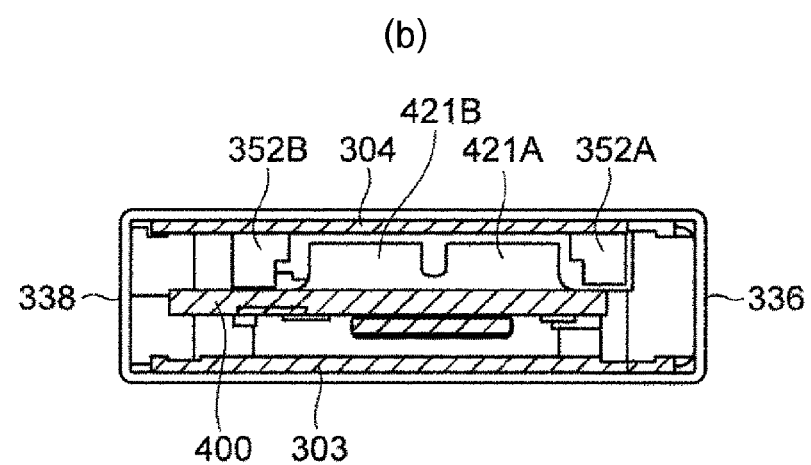
Figure 8:
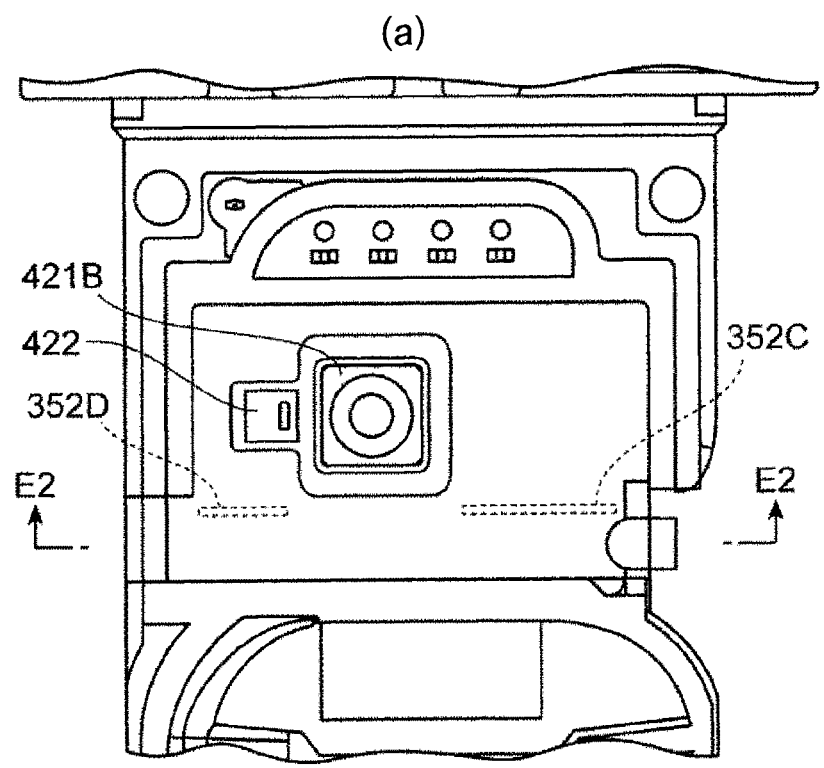
Figure 2:
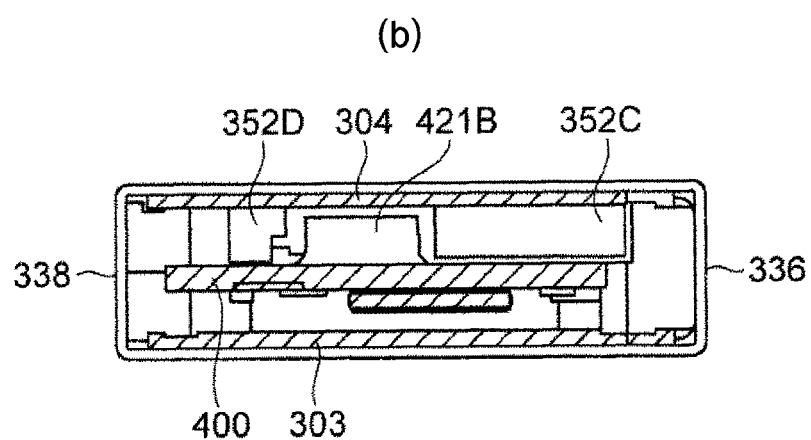
Figure 8:
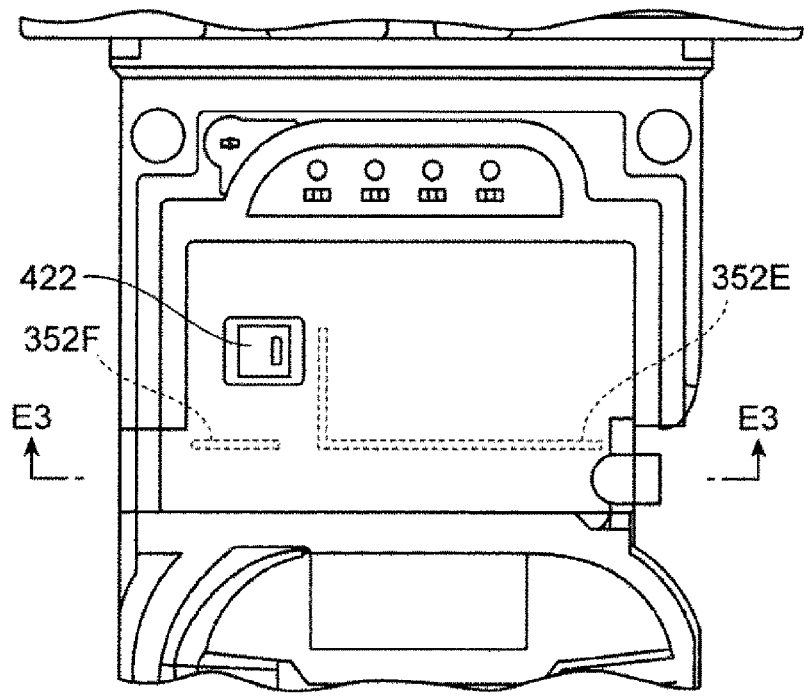
Figure 3:
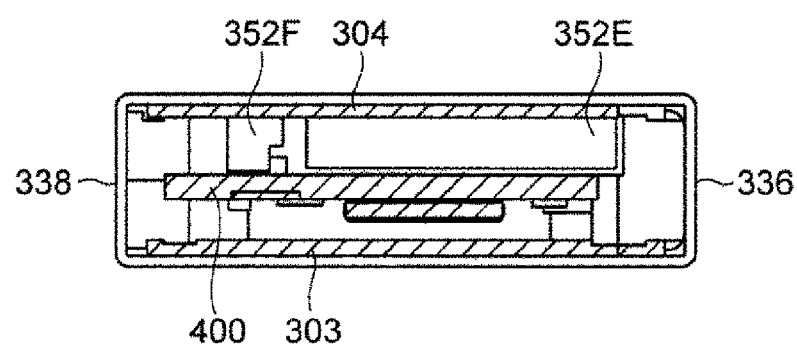

In the example of FIG. 8-1, two pressure sensors 421A and 421B are arranged side by side along the second bypass passage 306 in the sensor room Rs, and a single humidity sensor 422 is provided downstream of the pressure sensors 421A and 421B. The compartment walls 352A and 352B are provided in the back side cover 304 and are arranged to extend between the second bypass passage 306 and the sensor room Rs by installing the back side cover 304 in the housing 302. Specifically, the compartment wall 352A is arranged between the pressure sensor of the upstream side and the upstream wall of the sensor room Rs, and the compartment wall 352B is arranged along the humidity sensor between the downstream side pressure sensor and the downstream wall of the sensor room Rs.

In the example of FIG. 8-2, only the pressure sensor 421B of the downstream side is provided, and the pressure sensor 421A of the upstream side is omitted. Accordingly, the length of the compartment wall 352C increases. The compartment wall 352D of the downstream side is arranged along the humidity sensor between the pressure sensor of the downstream side and the downstream wall of the sensor room Rs, similarly to the compartment wall 352B of FIG. 8-1. Therefore, the compartment walls 352A and 352C can prevent measured gas 30 from directly colliding with the pressure sensor. Therefore, it is possible to reduce influence of a dynamic pressure. In addition, the compartment walls 352B and 352D can suppress a contaminant or a water droplet from being attached to the humidity sensor.

In the example of FIG. 8-3, both the two pressure sensors 421A and 421B are omitted, and only a single humidity sensor 422 is provided in the sensor room Rs. The compartment wall 352E of the upstream side extends from the upstream wall of the sensor room Rs to the upstream position of the humidity sensor between the second bypass passage 306 and the sensor room Rs and is bent to the downstream end, so that it has a substantially L-shape facing the upstream side of the humidity sensor. The compartment wall 352F is arranged along the humidity sensor between the pressure sensor of the downstream side and the downstream wall of the sensor room Rs, similarly to the compartment walls 352B and 352D. Therefore, the compartment wall 352E can prevent a contaminant or a water droplet contained in the measured gas 30 passing through the second bypass passage 306 from moving toward the humidity sensor. Therefore, it is possible to protect the humidity sensor from such a contaminant or the like.

3.4 Shapes and Effects of Front Side Cover 303 and Back Side Cover 304

Figures 2, 3, 4, 5, 6:
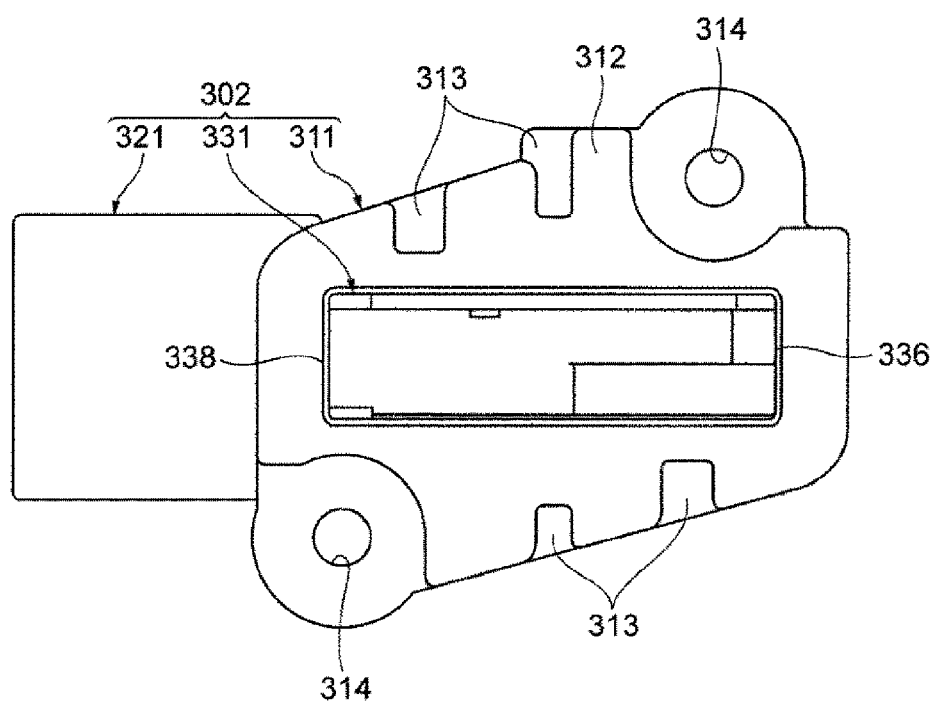
Figures 1, 3:
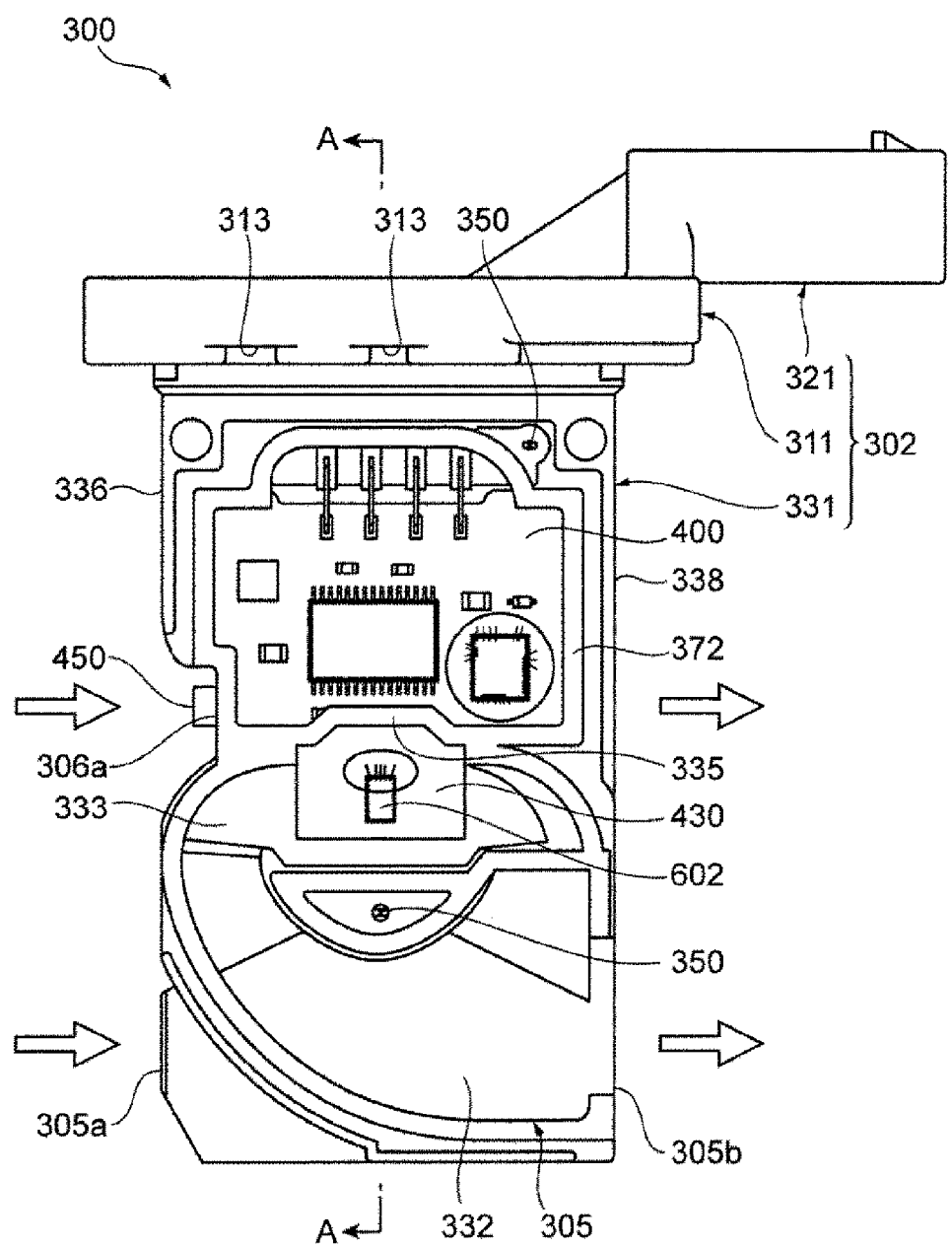
Figures 2, 3:
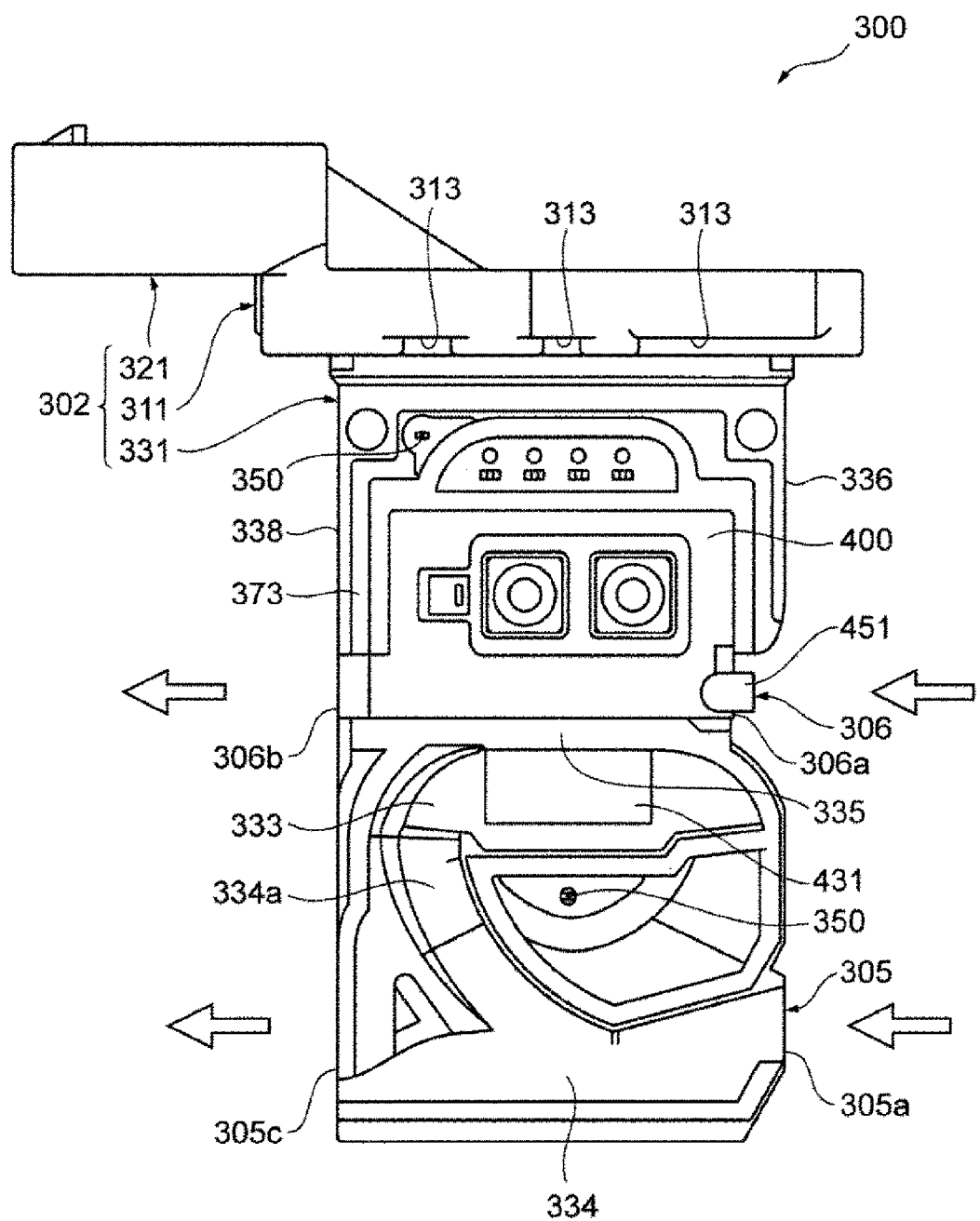
Figure 3:
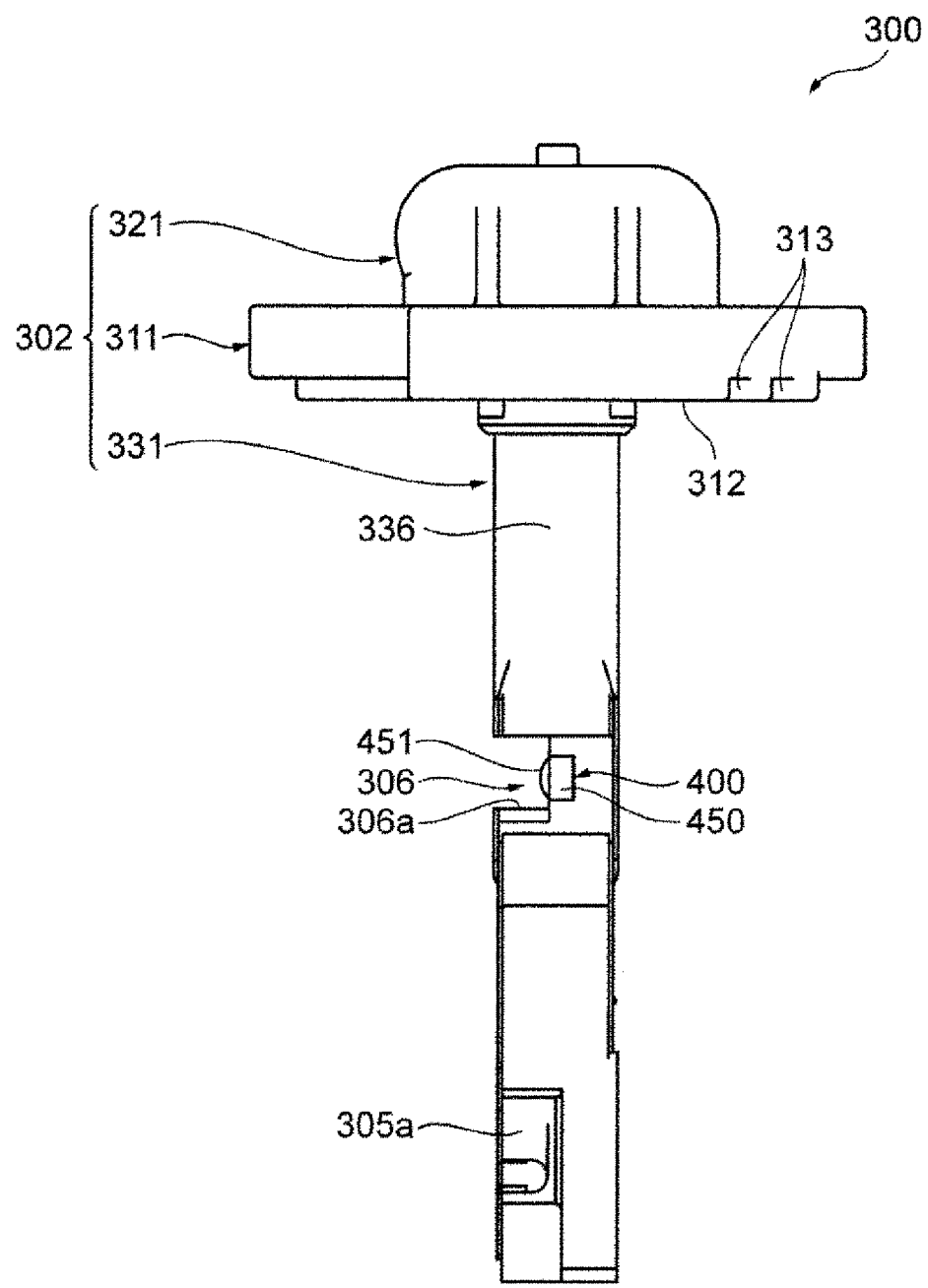
Figures 3, 4:
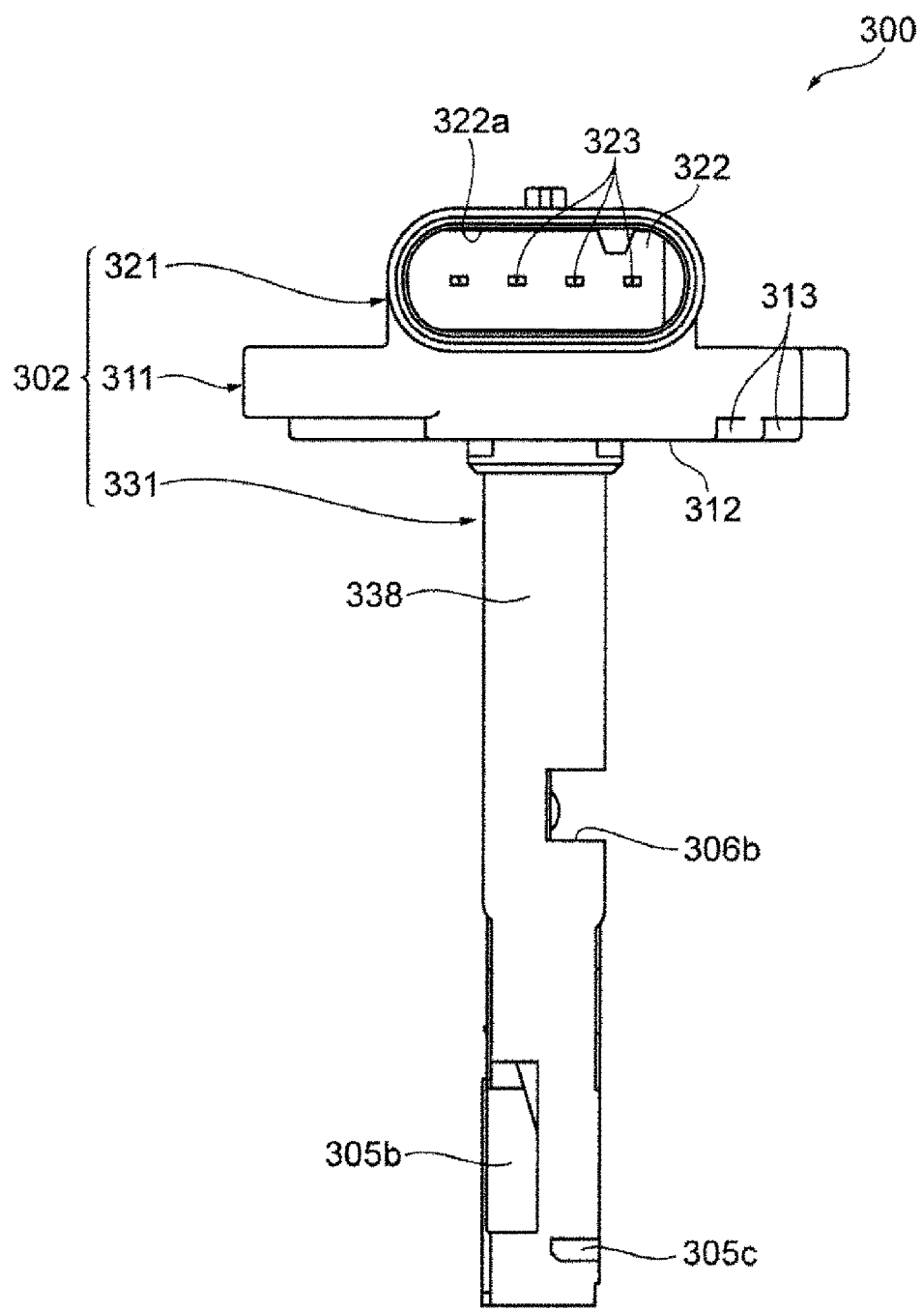
Figures 3, 4, 5:
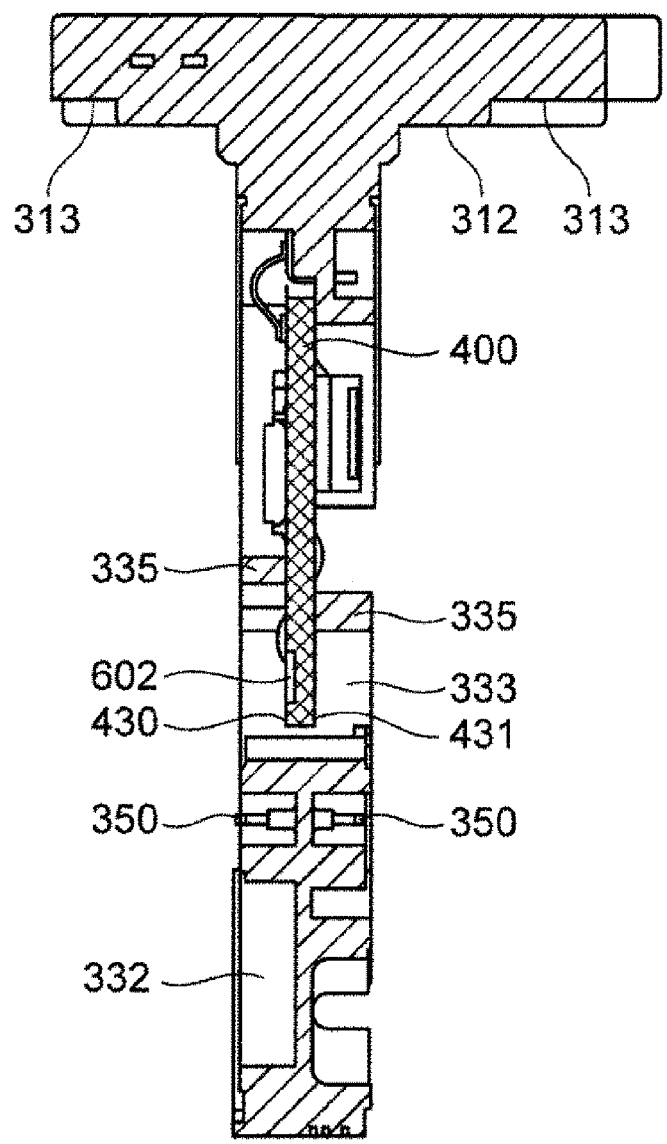
Figures 1, 4:
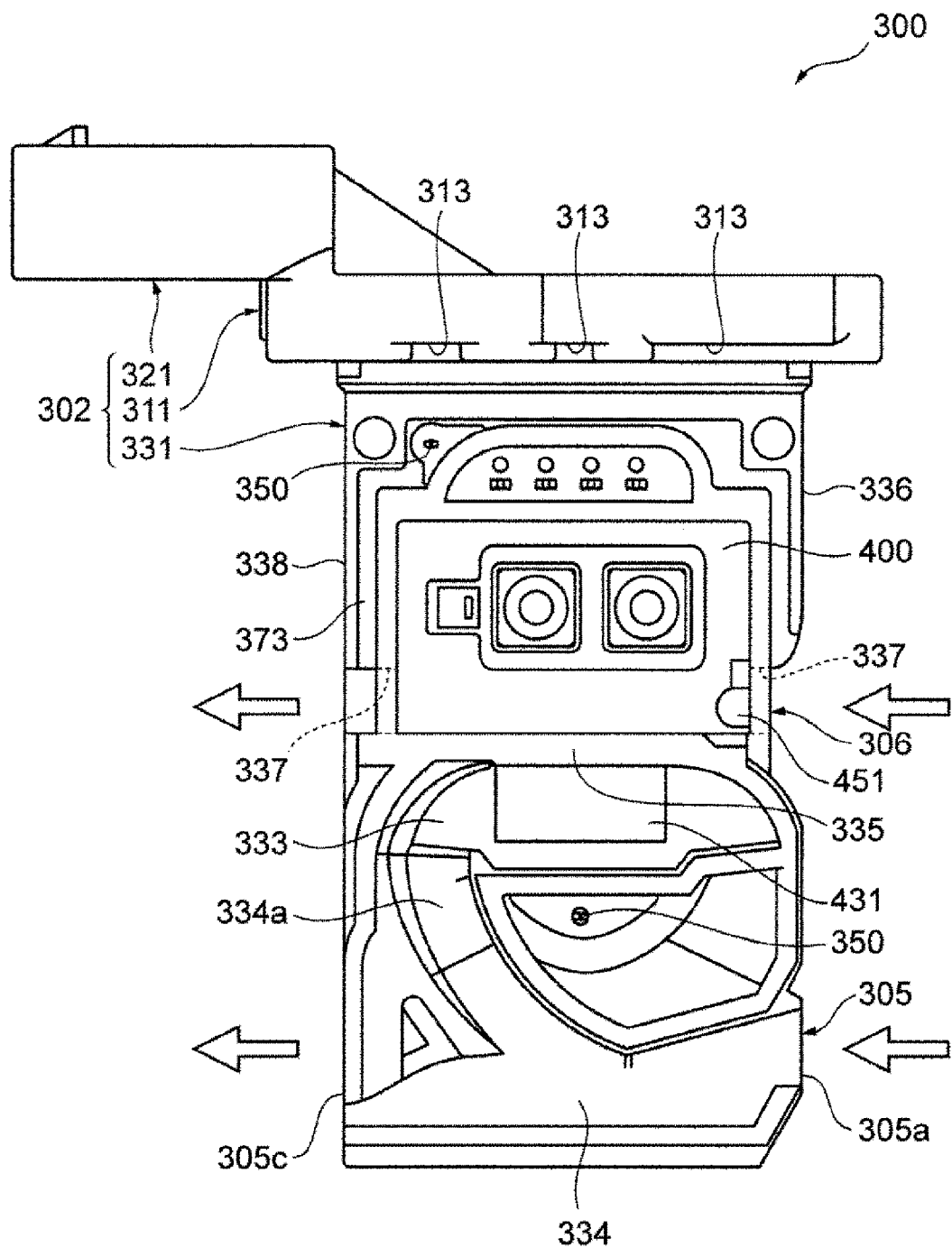
Figures 2, 4:
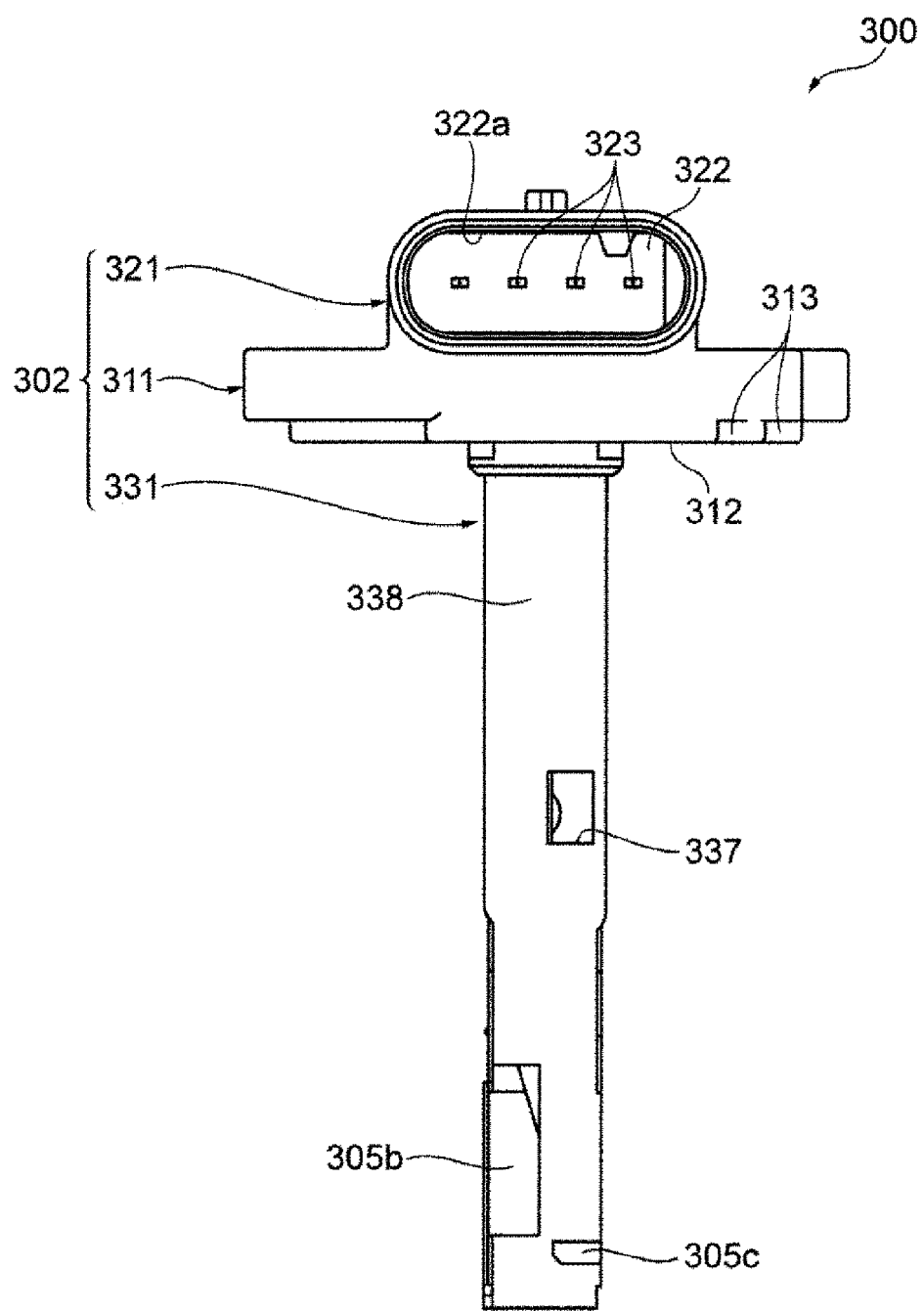
Figure 5:
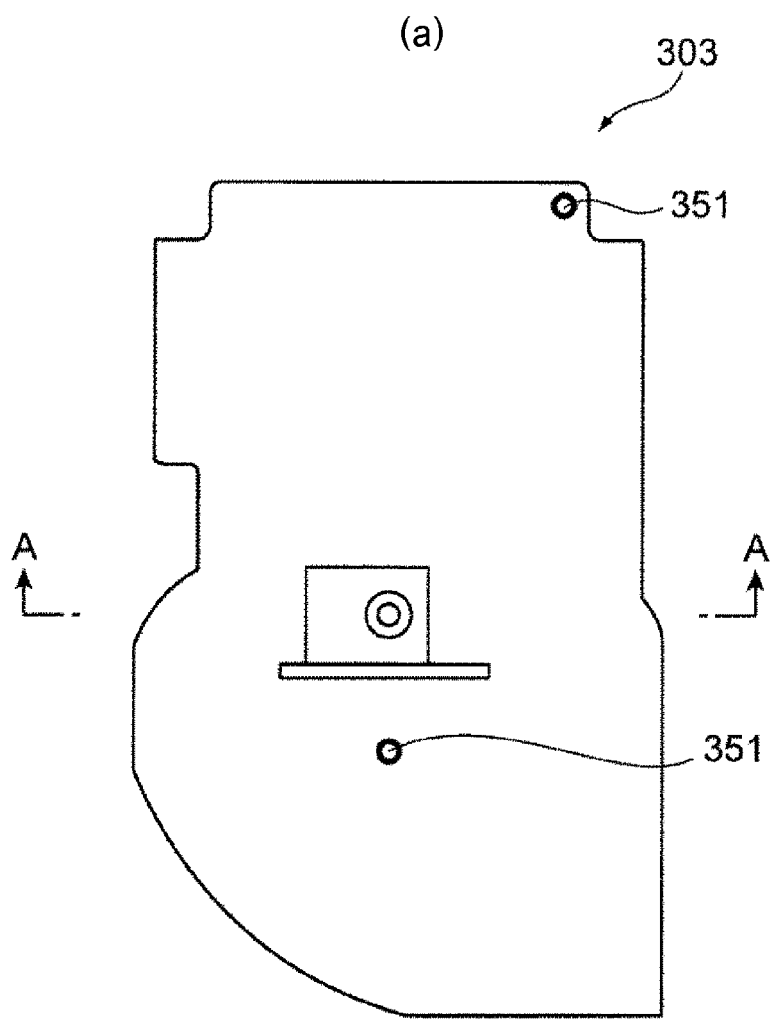
Figure 5:
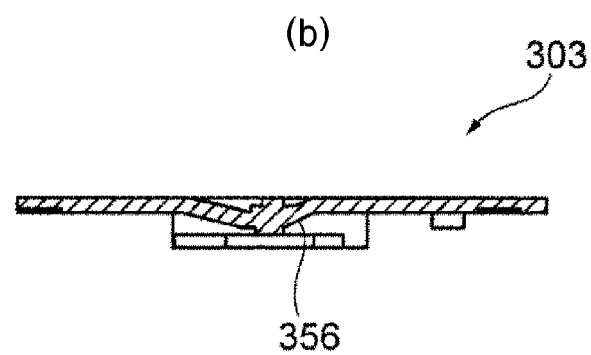
Figure 6:
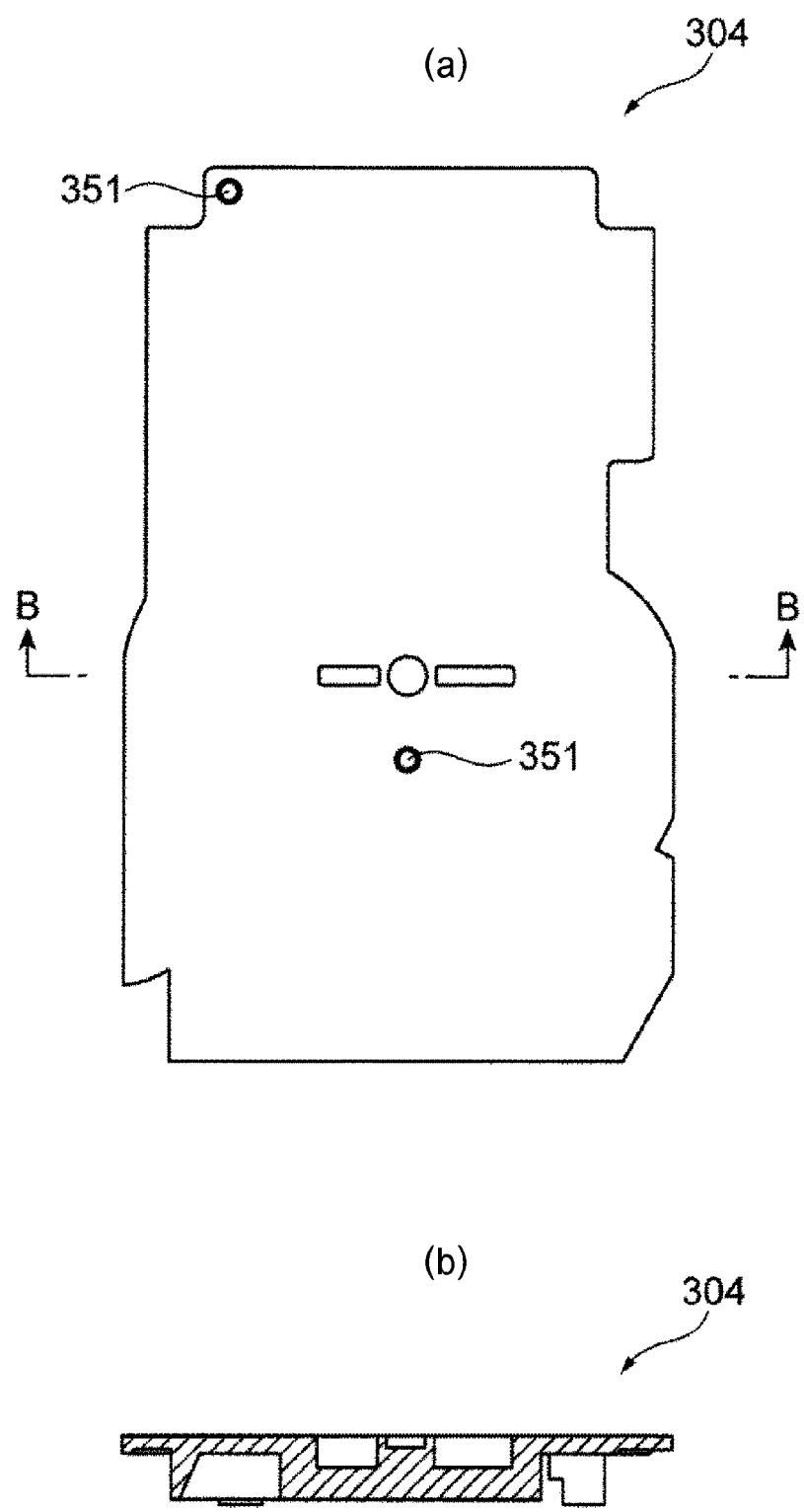

FIG. 5 is a diagram illustrating appearance of the front side cover 303, and FIG. 5(a) is a front view, and FIG. 5(b) is a cross-sectional view taken along a line B-B of FIG. 5(a). FIG. 6 is a diagram illustrating appearance of the back side cover 304. FIG. 6(a) is a front view, and FIG. 6(b) is a cross-sectional view taken along a line B-B of FIG. 6(a).

In FIGS. 5 and 6, the front side cover 303 or the back side cover 304 forms the first bypass passage 305 by blocking the back side bypass passage 334 using the groove of bypass passage at front side 332 of the housing 302. In addition, the front side cover 303 forms a hermetically sealed circuit room Rc, and the back side cover 304 forms the second bypass passage 306 and the sensor room Rs communicating with the second bypass passage 306 by blocking a recess of the back side of the measurement portion 331.

The front side cover 303 has a protrusion 356 in a position facing the detection area of air flow 602 and is used to form an orifice along with the front surface of main air flow 430. For this reason, it is desirable that the molding accuracy is high. The front side cover 303 or the back side cover 304 is formed through a resin mold process by injecting thermoplastic resin in a die. Therefore, it is possible to manufacture the front side cover or the back side cover with high molding accuracy.

The front side cover 303 and the back side cover 304 are provided with a plurality of fixing holes 351 into which a plurality of fixing pins 350 protruding from the measurement portion 331 are respectively inserted. The front side cover 303 and the back side cover 304 are installed in the front and back sides, respectively, of the measurement portion 331. In this case, the fixing pins 350 are inserted into the fixing holes 351 so that the front side cover 303 and the back side cover 304 are positioned. In addition, bonding is performed through laser welding or the like along the edges of the groove of bypass passage at front side 332 and the groove of bypass passage at back side 334. Similarly, bonding is performed through laser welding or the like along the edges of the circuit room Rc and the sensor room Rs.

3.5 Structure for Fixing Printed Circuit Board (PWB) 400 to Housing 302 and Effects Next, fixation of the printed circuit board (PWB) 400 to the housing 302 through a resin mold process will be described. The printed circuit board (PWB) 400 is molded integrally with the housing 302 such that the detection area of air flow 602 of the printed circuit board (PWB) 400 is disposed in a predetermined place of the bypass passage groove that forms the bypass passage, for example, in this embodiment, an aperture 333 which is a jointing portion between the groove of bypass passage at front side 332 and the groove of bypass passage at back side 334.

The measurement portion 331 of the housing 302 is provided with fixing portions 372 and 373 as a portion for burying and fixing an outer edge portion of the base portion 402 of the printed circuit board (PWB) 400 in the housing 302 through resin molding. The fixing portions 372 and 373 fix the outer edge portion of the base portion 402 of the printed circuit board (PWB) 400 by nipping it between the front and back sides.

The housing 302 is manufactured through a resin mold process. Through this resin mold process, the printed circuit board (PWB) 400 is embedded in the resin of the housing 302 and is fixed inside the housing 302 using a resin mold. As a result, the detection area of air flow 602 transfers heat with the measured gas 30, so that it is possible to maintain a shape relationship, a position relationship, or a direction relationship of the bypass passage for measuring the flow rate, for example, the groove of bypass passage at front side 332 or the groove of bypass passage at back side 334 with remarkably high accuracy. Therefore, it is possible to suppress an error or deviation generated in the printed circuit board (PWB) 400 to a very small value. Resultantly, it is possible to remarkably improve measurement accuracy of the printed circuit board (PWB) 400. In comparison with the fixing method using an adhesive of the related art, it is possible to dramatically improve measurement accuracy.

The sensor device for physical quantities 300 is produced through mass production in many cases. In the method of using an adhesive with strict measurement in this case, improvement of the measurement accuracy has a limitation. However, according to this embodiment, the bypass passage is formed in the resin mold process in which the bypass passage for flowing the measured gas 30 is molded, and the printed circuit board (PWB) 400 is fixed. Therefore, it is possible to remarkably reduce a deviation of the measurement accuracy and remarkably improve measurement accuracy of each sensor device for physical quantities 300.

For example, in the case of the embodiment illustrated in FIGS. 3-1 to 3-5, it is possible to fix the printed circuit board (PWB) 400 to the housing 302 with high accuracy such that a relationship between the groove of bypass passage at front side 332, the groove of bypass passage at back side 334, and the detection area of air flow 602 becomes a prescribed relationship. In the sensor device for physical Quantities 300 produced in this way, it is possible to normally obtain a position relation or a relationship such as a shape between the detection area of air flow 602 and the first bypass passage 305 of each printed circuit board (PWB) 400 with remarkably high accuracy.

In the first bypass passage 305 in which the detection area of air flow 602 of the printed circuit board (PWB) 400 is fixedly arranged, for example, the groove of bypass passage at front side 332 and the groove of bypass passage at back side 334 can be formed with remarkably high accuracy. Therefore, a work of forming the first bypass passage 305 from the bypass passage grooves 332 and 334 is a work of covering both surfaces of the housing 302 using the front side cover 303 or the back side cover 304. This work is very simple and is a work process having a little factor of degrading measurement accuracy. In addition, the front side cover 303 or the back side cover 304 is produced through a resin mold process having high molding accuracy. Therefore, it is possible to obtain the bypass passage provided in a prescribed relationship with the detection area of air flow 602 of the printed circuit board (PWB) 400 with high accuracy. Using this method, it is possible to obtain high productivity in addition to improvement of measurement accuracy.

In comparison, in the related art, a thermal type flowmeter has been produced by manufacturing the bypass passage and then bonding the measurement portion to the bypass passage using an adhesive. In the method of using the adhesive in this manner, the thickness of the adhesive is irregular, and a bonding position or angle is different depending on products. For this reason, there is a limitation in improvement of measurement accuracy. Furthermore, if this work is performed in a mass production process, improvement of the measurement accuracy is very difficult.

According to the embodiment of the invention, the printed circuit board (PWB) 400 is fixed using a resin mold, and the bypass passage groove for forming the first bypass passage 305 is molded using a resin mold. As a result, it is possible to shape the bypass passage Groove and fix the detection area of air flow 602 to the bypass passage groove with remarkably high accuracy.

A portion relating to the measurement of the flow rate, for example, the detection area of air flow 602 or the front surface of main air flow 430 in which the detection area of air flow 602 is installed are provided on the surface of the printed circuit board (PWB) 400. The detection area of air flow 602 and the front surface of main air flow 430 are exposed from the resin used to mold the housing 302. That is, the detection area of air flow 602 and the front surface of main air flow 430 are not covered by the resin used to mold the housing 302. The detection area of air flow 602 or the front surface of main air flow 430 of the printed circuit board (PWB) 400 is directly used after the resin molding of the housing 302, and is used in flow rate measurement of the sensor device for physical quantities 300. As a result, measurement accuracy is improved.

According to the embodiment of the invention, the printed circuit board (PWB) 400 is fixed to the housing 302 having the first bypass passage 305 by forming the printed circuit board (PWB) 400 integrally with the housing 302. Therefore, it is possible to securely fix the printed circuit board (PWB) 400 to the housing 302. In particular, since the exposed portion of PWB 403 of the printed circuit board (PWB) 400 penetrates through the partitioning wall 335 and protrudes to the first bypass passage 305, a sealing property between the first bypass passage 305 and the circuit room Rc is high Therefore, it is possible to prevent the measured gas 30 from leaking and intruding from the first bypass passage 305 to the circuit room Rc and prevent circuit components or wires of the printed circuit board (PWB) 400 from being corroded by making contact with the measured gas 30.

3.6 Structure and Effect of Terminal Connection Portion 320

Figures 1, 9:
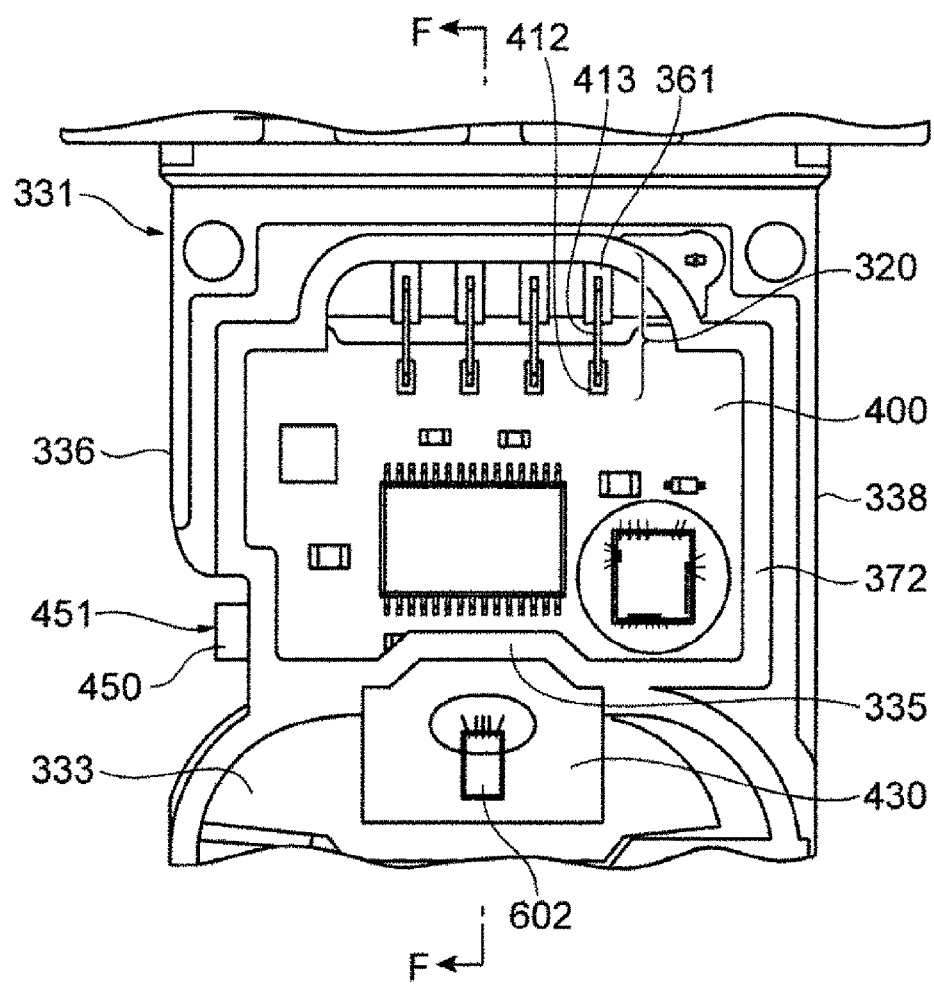
Figures 2, 9:
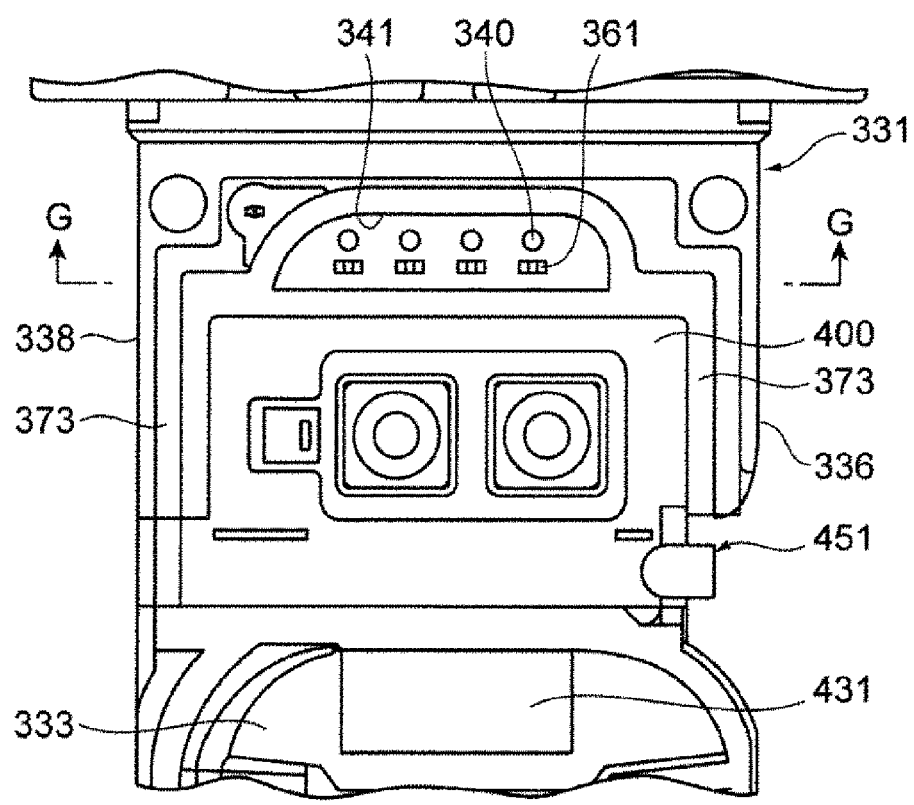
Figures 3, 9:
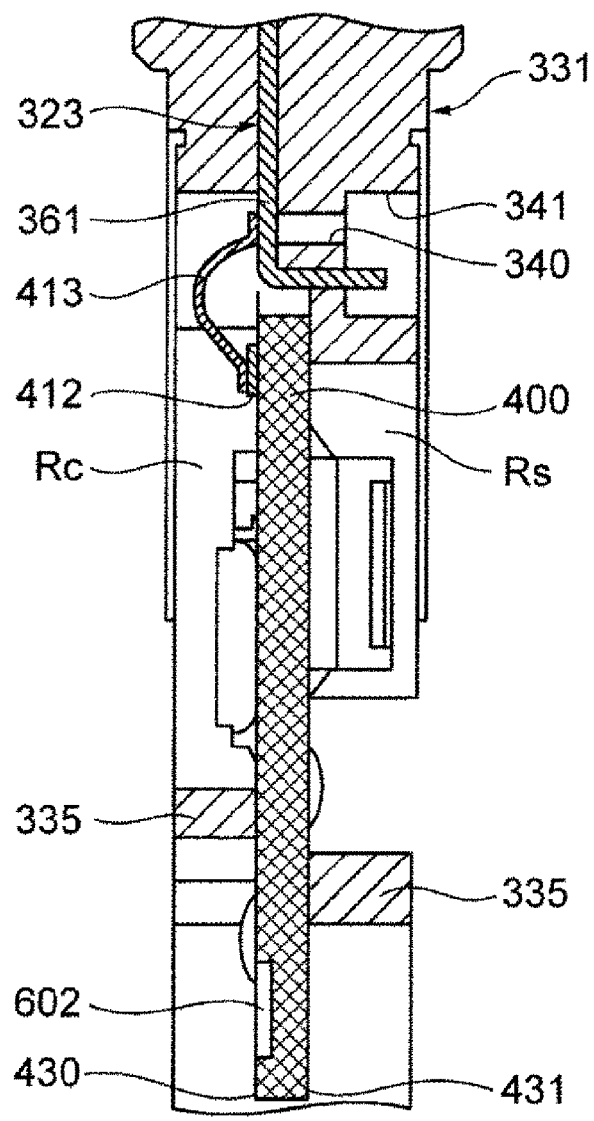
Figure 9:
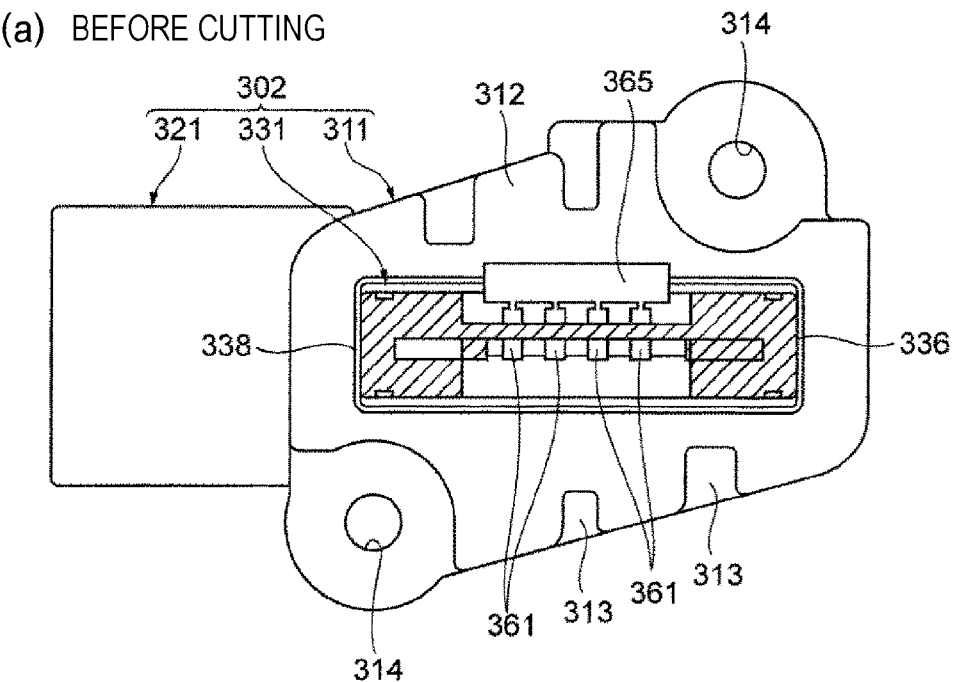
Figure 4:
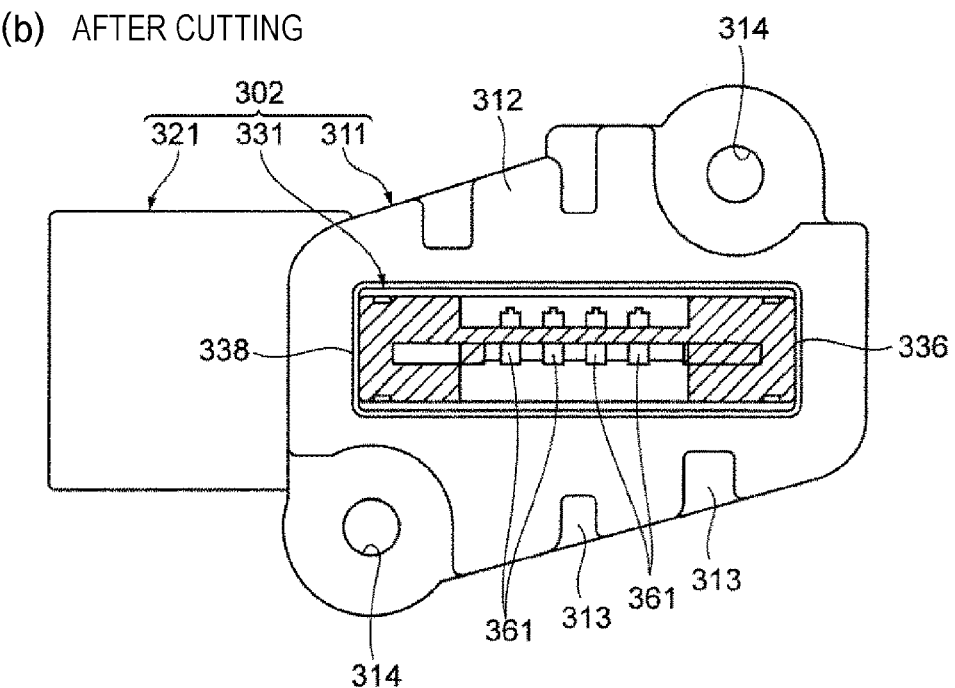

Next, a structure of the terminal connection portion will be described with reference to FIGS. 9-1 to 9-4. FIG. 9-1 is a diagram illustrating a structure of the terminal connection portion, and FIG. 9-2 is a diagram illustrating a structure of the terminal connection portion. FIG. 9-3 is a cross-sectional view taken along a line F-F of FIG. 9-1, and FIG. 9-4 is a cross-sectional view taken along a line G-G of FIG. 9-2.

The terminal connection portion 320 has a configuration in which the inner end portion 361 of the external terminal 323 and the connection terminal 412 of the printed circuit board (PWB) 400 are connected to each other with a gold wire 413. As illustrated in FIG. 9-1, the inner end portions 361 of each external terminal 323 protrude to the inside of the circuit room Rc from the flange 311 side and are arranged side by side with a predetermined interval to match positions of the connection terminals 412 of the printed circuit board (PWB) 400.

The inner end portion 361 is disposed in a position substantially coplanar with a front side of the printed circuit board (PWB) 400 as illustrated in FIG. 9-3. In addition, its tip is bent substantially in an L-shape from the front side to the back side of the measurement portion 331 and protrudes to the back side of the measurement portion 331. Each inner end portion 361 has a tip connected to each tie portion 365 as illustrated in FIG. 9-4(a), and the tie portion 365 is removed and separated after the molding as illustrated in FIG. 9-4(b).

In the molding process, each inner end portion 361 is fixed to the housing 302 through resin molding such that the inner end portion 361 and the printed circuit board (PWB) 400 are arranged on the same plane. Each inner end portion 361 is fixed to the housing 302 through a resin mold process while they are connected to each other with the tie portion 365 in an integral state, in order to prevent a deformation or a deviation of the arrangement. In addition, after fixing to the housing 302, the tie portion 365 is removed.

The inner end portion 361 is resin-molded while it is nipped between the front and back sides of the measurement portion 331. In this case, a die abuts on the entire surface of the front side of the inner end portion 361, and a fixing pin abuts on the back side of the inner end portion 361. Therefore, the front side of the inner end portion 361 where a gold wire is welded can be perfectly exposed without being covered by the resin mold due to leakage of resin. Therefore, it is possible to easily perform welding of the gold wire. Note that a pin hole 340 having a trace formed by pressing the inner end portion 361 with the fixing pin is formed in the measurement portion 331.

The tip of the inner end portion 361 protrudes to the recess 341 formed in the back side of the measurement portion 331. The recess 341 is covered by the back side cover 304, and the periphery of the recess 341 is bonded to the back side cover 304 in a continuous manner through laser welding and the like to form a hermetically sealed internal space. Therefore, it is possible to prevent the inner end portion 361 from being corroded by making contact with the measured gas 30.

4. Appearance of Printed Circuit Board (PWB) 400

4.1 Formation of Front Surface of Main Air Flow 430 Provided with Detection Area of Air Flow 602

Figures 1, 7:
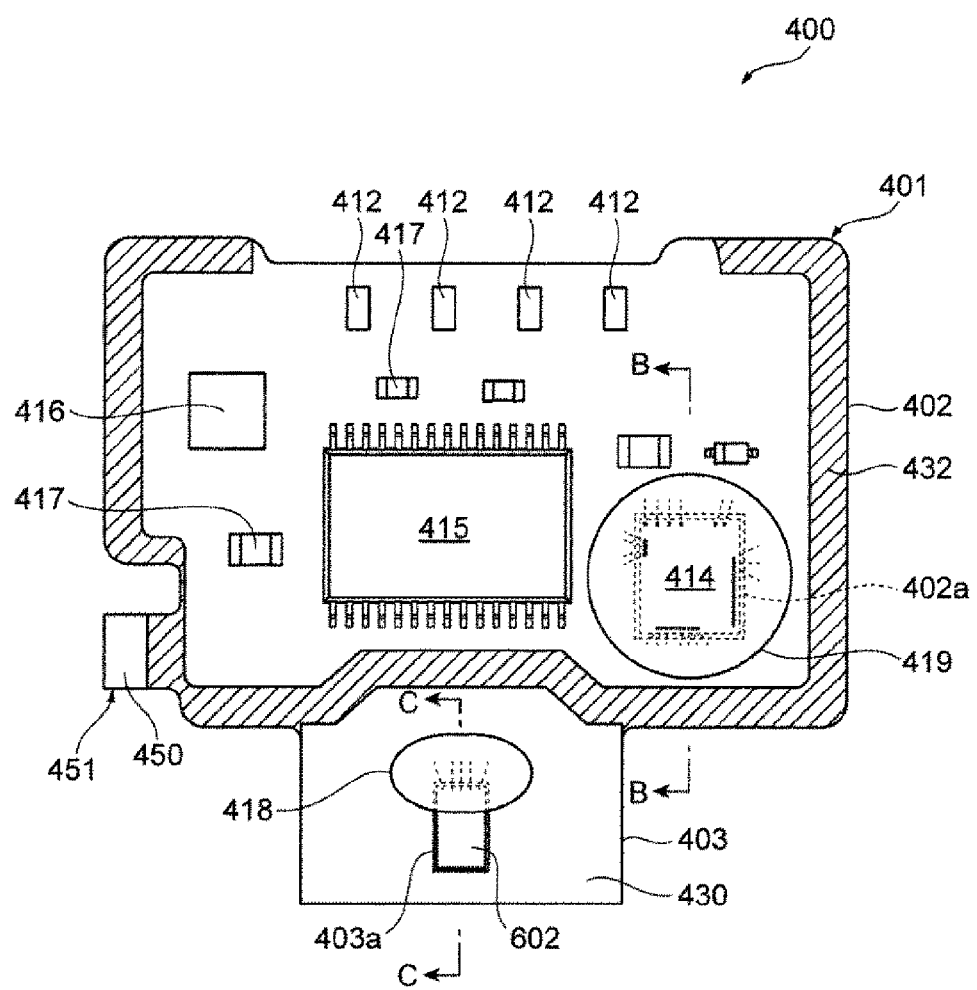
Figures 2, 7:
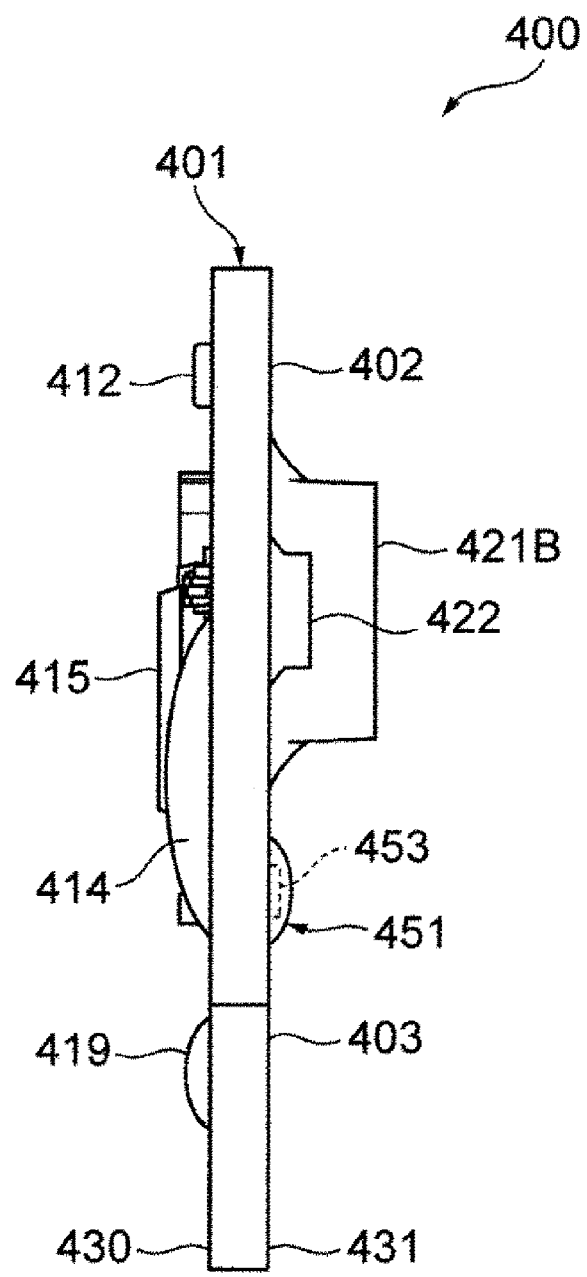
Figures 3, 7:
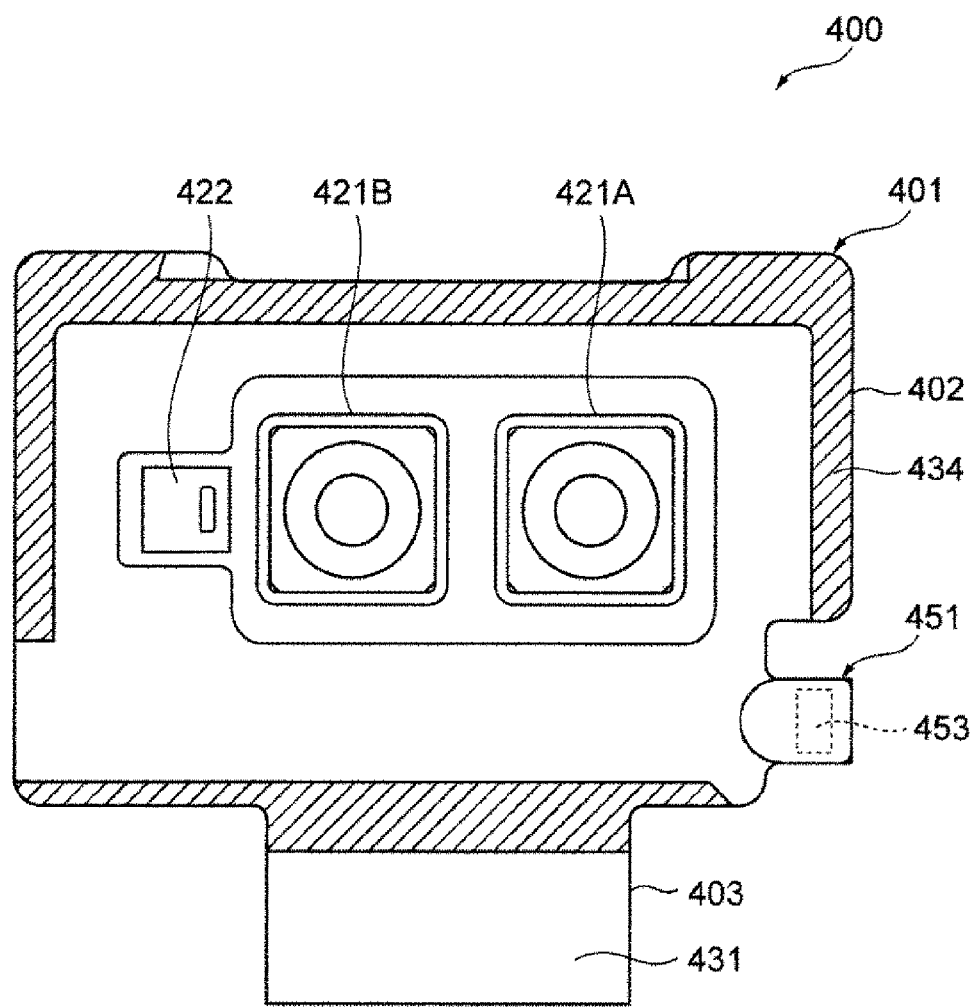
Figures 4, 7:
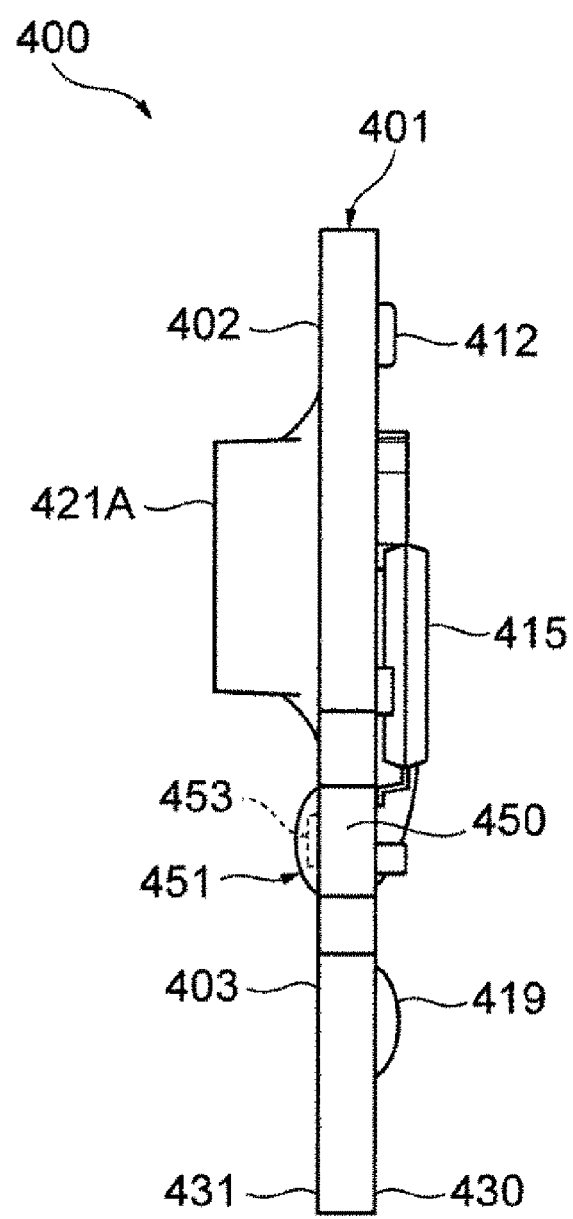
Figures 5, 7:
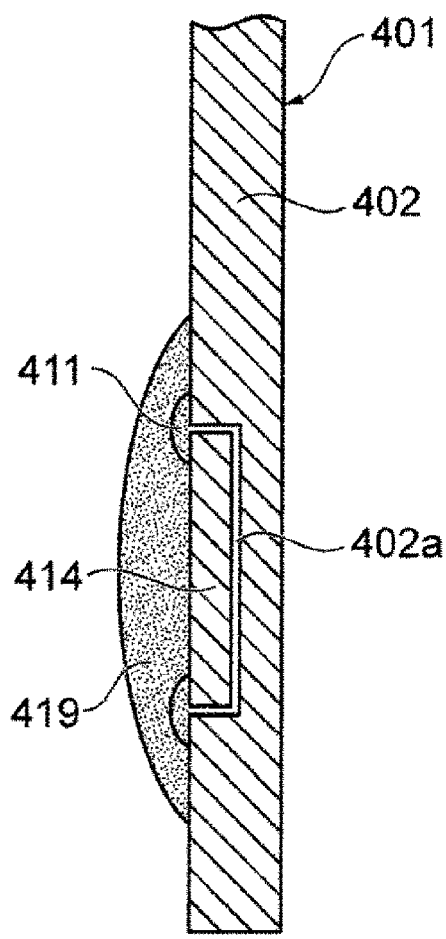
Figures 6, 7:
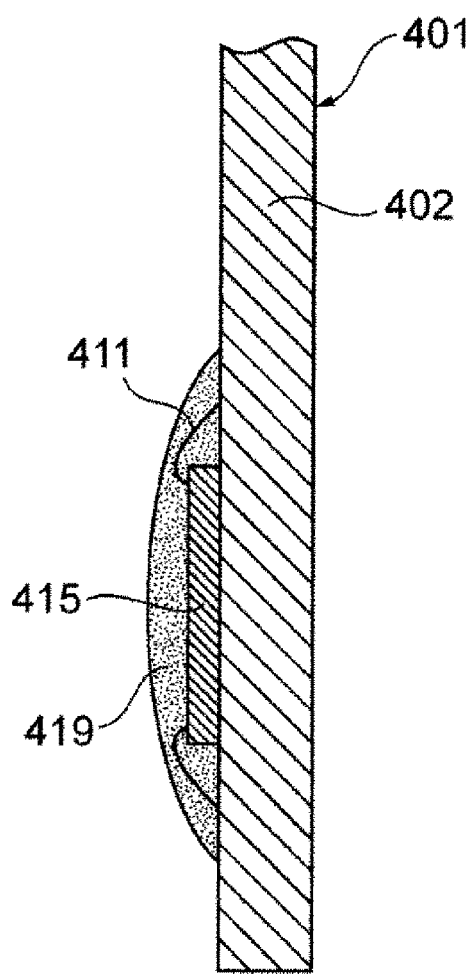
Figure 7:
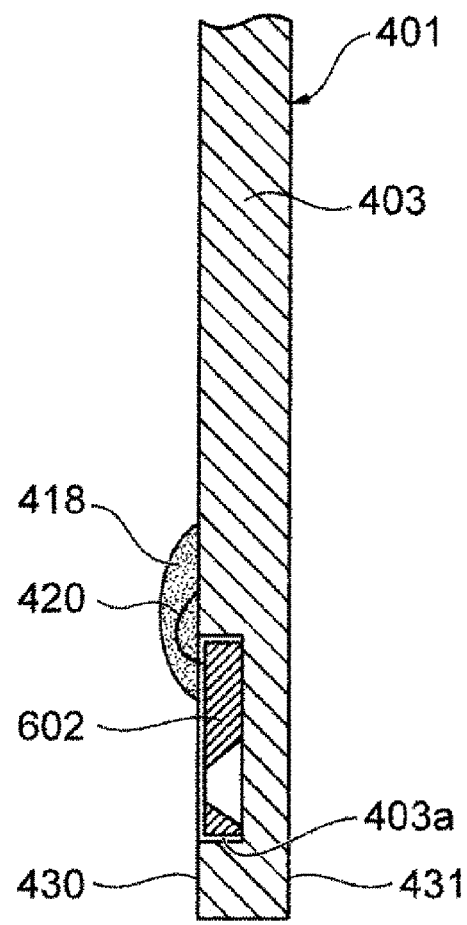

FIGS. 7-1 to 7-6 illustrate appearance of the printed circuit board (PWB) 400. Note that the hatched portion inserted into appearance of the printed circuit board (PWB) 400 indicates the fixing surfaces 432 and 434 where the printed circuit board (PWB) 400 is covered and fixed by resin when the housing 302 is molded through a resin mold process.

FIG. 7-1 is a front view illustrating the printed circuit board, and FIG. 7-2 is a right side view illustrating the printed circuit board. FIG. 7-3 is a rear view illustrating the printed circuit board, and FIG. 7-4 is a left side view illustrating the printed circuit board. FIG. 7-5 is a cross-sectional view taken along a line B-B of FIG. 7-1 to show a cross section of the LSI portion, and FIG. 7-6 is a cross-sectional view taken along a line C-C of the detection portion of FIG. 7-1.

The printed circuit board (PWB) 400 has a board body 401. A circuit portion and a detection area of air flow 602 as a sensing element are provided on a front side of the board body 401, and a pressure sensor 421 and a humidity sensor 422 as a sensing element are provided on the back side of the board body 401. The board body 401 is formed of a glass epoxy resin material and has a thermal expansion coefficient equal to or close to that of thermoplastic resin used to mold the housing 302. Therefore, it is possible to reduce a stress caused by a difference of the thermal expansion coefficient when the board body is insert-molded to the housing 302 and reduce a distortion of the printed circuit board (PWB) 400.

The board body 401 has a substantially T-shape as seen in a plan view, including a substantially quadrilateral base portion 402 having a flat shape having a constant thickness and a substantially quadrilateral exposed portion of PWB 403 protruding from one side of the base portion 402 and smaller than the base portion 402. The circuit portion is provided in the front side of the base portion 402. The circuit portion is formed by mounting electronic components such as an LSI 414, a microprocessor 415, a power regulator 416, a chip part 417 such as a resistor and a capacitor, and the like after circuit wiring (not shown). The power regulator 416 generates a larger amount of heat, compared to other electronic components such as the microprocessor 415 or the LSI 414 and is thus arranged in a relatively upstream side in the circuit room Rc. The LSI 414 is entirely encapsulated with a synthetic resin material 419 to cover the gold wire 411. Therefore, handleability of the printed circuit board (PWB) 400 at the time of insert molding is improved.

As illustrated in FIG. 7-5, a recess 402a where the LSI 414 is fitted is recessed on the front side of the board body 401. This recess 402a may be formed by applying laser machining to the board body 401. The board body 401 formed of a Glass epoxy resin material can be easily fabricated compared to the board body formed of a ceramic material. Therefore, it is possible to easily provide the recess 402. The recess 402 has a depth set such that the front side of the LSI 414 becomes coplanar with the front side of the board body 401. In this manner, by matching the height of the front side between the LSI 414 and the board body 401, wire bonding for linking the LSI 414 and the board body 401 with the gold wire 411 becomes easy. Therefore, it is possible to facilitate manufacturing of the printed circuit board (PWB) 400. For example, the LSI 414 may be directly provided on the front side of the board body 401 as illustrated in FIG. 7-6. In the case of such a structure, the synthetic resin material 419 with which the LSI 414 is coated protrudes higher. However, fabrication for forming the recess 402 in the board body 401 becomes unnecessary. Therefore, it is possible to simplify manufacturing.

The exposed portion of PWB 403 is arranged in the first bypass passage 305 when the printed circuit board (PWB) 400 is insert-molded to the housing 302. Therefore, the front surface of main air flow 430 as a front side of the exposed portion of PWB 403 extends along the flow direction of the measured gas 30. The detection area of air flow 602 is provided in the front surface of main air flow 430 of the exposed portion of PWB 403. The detection area of air flow 602 performs heat transfer with the measured gas 30 and outputs a state of the measured gas 30 such as an electrical signal obtained by measuring a flow velocity of the measured gas 30 to represent a flow rate of the main passage 124. In order to measure the state of the measured gas 30 with high accuracy using the detection area of air flow 602, it is desirable that a gas flowing in the vicinity of the front surface of main air flow 430 is a laminar flow and less disturbed. For this reason, it is desirable that the front side of the detection area of air flow 602 and the front surface of main air flow 430 are coplanar, a height difference is equal to or smaller than a predetermined value.

A recess 403a is recessed on the front surface of main air flow 430, and the detection area of air flow 602 is fitted to the recess 403a. This recess 403a may be also formed through laser machining. The recess 403a has a depth set such that the front side of the detection area of air flow 602 and the front surface of main air flow 430 are coplanar with each other. The detection area of air flow 602 and its wiring portion are coated with a synthetic resin material 418.

Therefore, it is possible to prevent electrolytic corrosion caused by adhesion of salt water.

Two pressure sensors 421A and 421B and one humidity sensor 422 are provided on the back side of the board body 401. The two pressure sensors 421A and 421B are arranged in a line while being separated into the upstream and downstream sides. In addition, the humidity sensor 422 is arranged in the downstream side of the pressure sensor 421B. The two pressure sensors 421A and 421B and one humidity sensor 422 are arranged inside the sensor room Rs. In the example of FIG. 7-3, a case where two pressure sensors 421A and 421B and one humidity sensor 422 are provided has been described. However, as illustrated in FIG. 8-2(a), only the pressure sensor 421B and the humidity sensor 422 may also be provided. Alternatively, as illustrated in FIG. 8-3(a), only the humidity sensor 422 may also be provided.

In the printed circuit board (PWB) 400, the second bypass passage 306 is provided in the back side of the board body 401. Therefore, the board body 401 can be entirely cooled using the measured gas 30 passing through the second bypass passage 306.

4.2 Structure of Detection Area of Temperature 451

A detection area of temperature 451 is provided at an edge of the upstream side of the base portion 402 and in a corner portion of the exposed portion of PWB 403 side. The detection area of temperature 451 forms one of detection portions for detecting a physical quantity of the measured gas 30 flowing through the main passage 124 and is provided in the printed circuit board (PWB) 400. The printed circuit board (PWB) 400 has an exposed portion of PWB 450 protruding upstream of the measured gas 30 from the inlet of second bypass passage 306a of the second bypass passage 306. The detection area of temperature 451 has a chip type temperature sensor 453 provided on the back side of the printed circuit board (PWB) 400 in the exposed portion of PWB 450. The temperature sensor 453 and its wiring portion are coated with a synthetic resin material, so that it is possible to prevent electrolytic corrosion caused by adhesion of salt water.

For example, as illustrated in FIG. 3-2, in the center of the measurement portion 331 where the inlet of second bypass passage 306a is provided, the outer wall at upstream 336 of the measurement portion 331 included in the housing 302 is recessed toward the downstream side, and the exposed portion of PWB 450 of the printed circuit board (PWB) 400 protrudes from the outer wall at upstream 336 having a dent shape to the upstream side. A tip of the exposed portion of PWB 450 is disposed in a position more recessed than the most upstream side surface of the outer wall at upstream 336. The detection area of temperature 451 is provided in the exposed portion of PWB 450 to face the back side of the printed circuit board (PWB) 400, that is, the second bypass passage 306 side.

Since the inlet of second bypass passage 306a is provided in the downstream side of the detection area of temperature 451, the measured gas 30 flowing from the inlet of second bypass passage 306a to the second bypass passage 306 makes contact with the detection area of temperature 451 and then flows to the inlet of second bypass passage 306a. The temperature is detected when the measured gas 30 makes contact with the detection area of temperature 451. The measured gas 30 making contact with the detection area of temperature 451 directly flows from the inlet of second bypass passage 306a to the second bypass passage 306, passes through the second bypass passage 306, and is then discharged from the outlet of second bypass passage 306b to the main passage 123.

4.3 Configuration of Third Passage

FIGS. 11-1, 11-2, and 11-3 illustrate a configuration example of the physical quantity measurement device having a drainage hole 720. The groove of bypass passage at back side 334 of FIG. 11-1 includes a first passage 701 straightly extending from the inlet groove to which the measured gas 30 flows from the main passage 124 to the discharge port 305c of the outer wall at downstream 338, a second passage 702 extending from the first bifurcation area 801 to the detection area of air flow 602, and a third passage 703 that passes via the second bifurcation area 802 in the upstream side of the second passage 702. In addition, the groove of bypass passage at back side 334 forms the bypass passage 305 in cooperation with the cover 304. The hollow portion includes a total of four surfaces of a wall surface of cover 713, a side-wall surface 712 of the groove of bypass passage at back side 334 facing the wall surface of cover 713, an inner circumferential wall 710 consisting of only the groove of bypass passage at back side 334, and an outer circumferential wall 711. The inner circumferential wall 710 extends from the first passage 701 to the second passage 702 via the third passage 703. Meanwhile, the outer circumferential wall 711 straightly extends to the discharge port 305c.

Figures 1, 11:
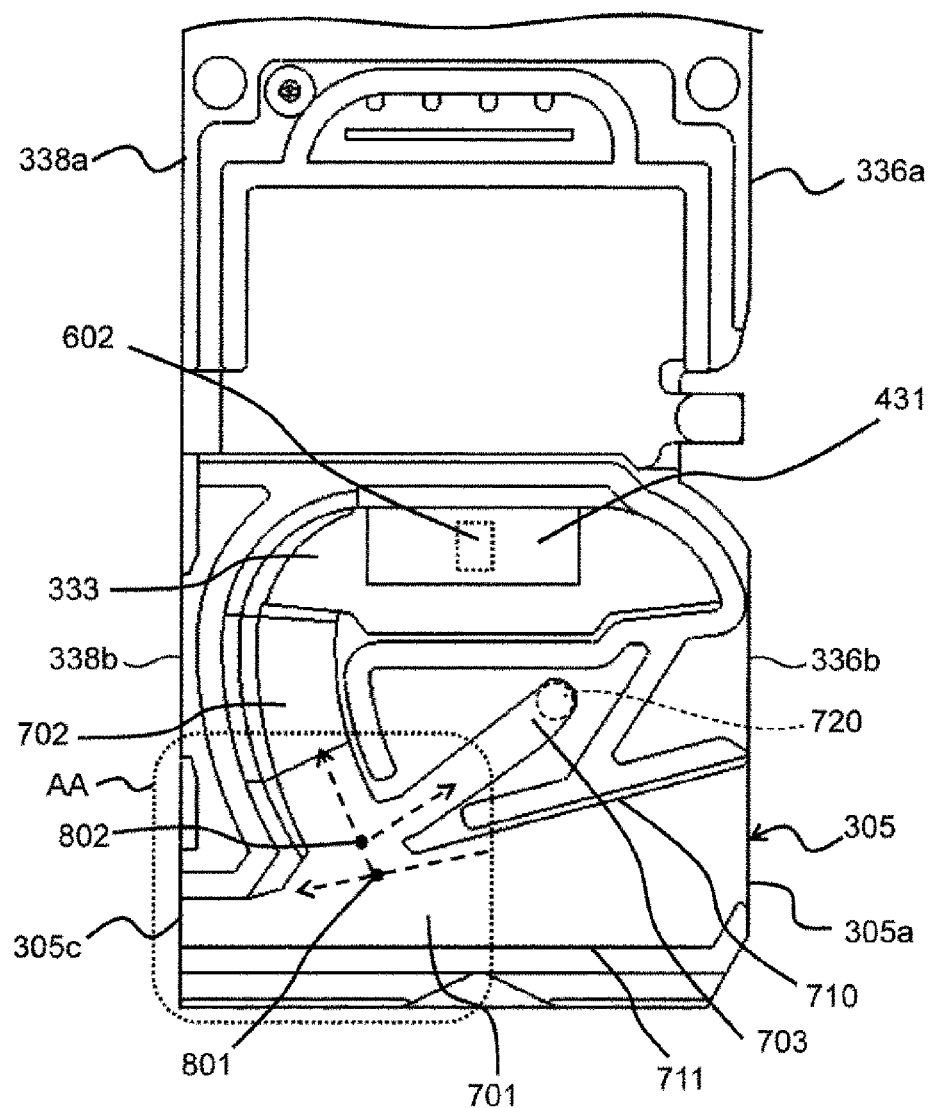
Figures 2, 11:
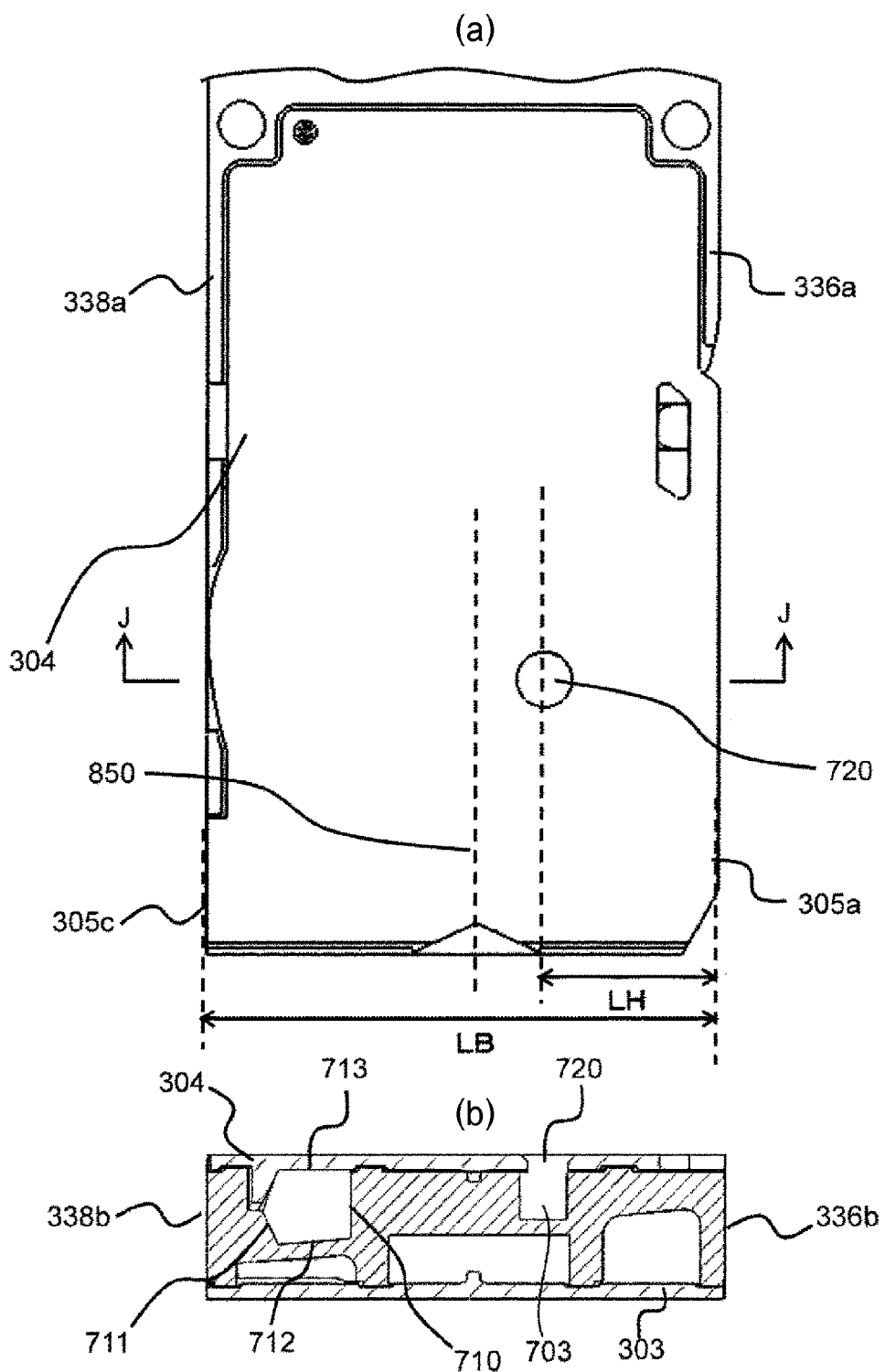
Figures 3, 11:
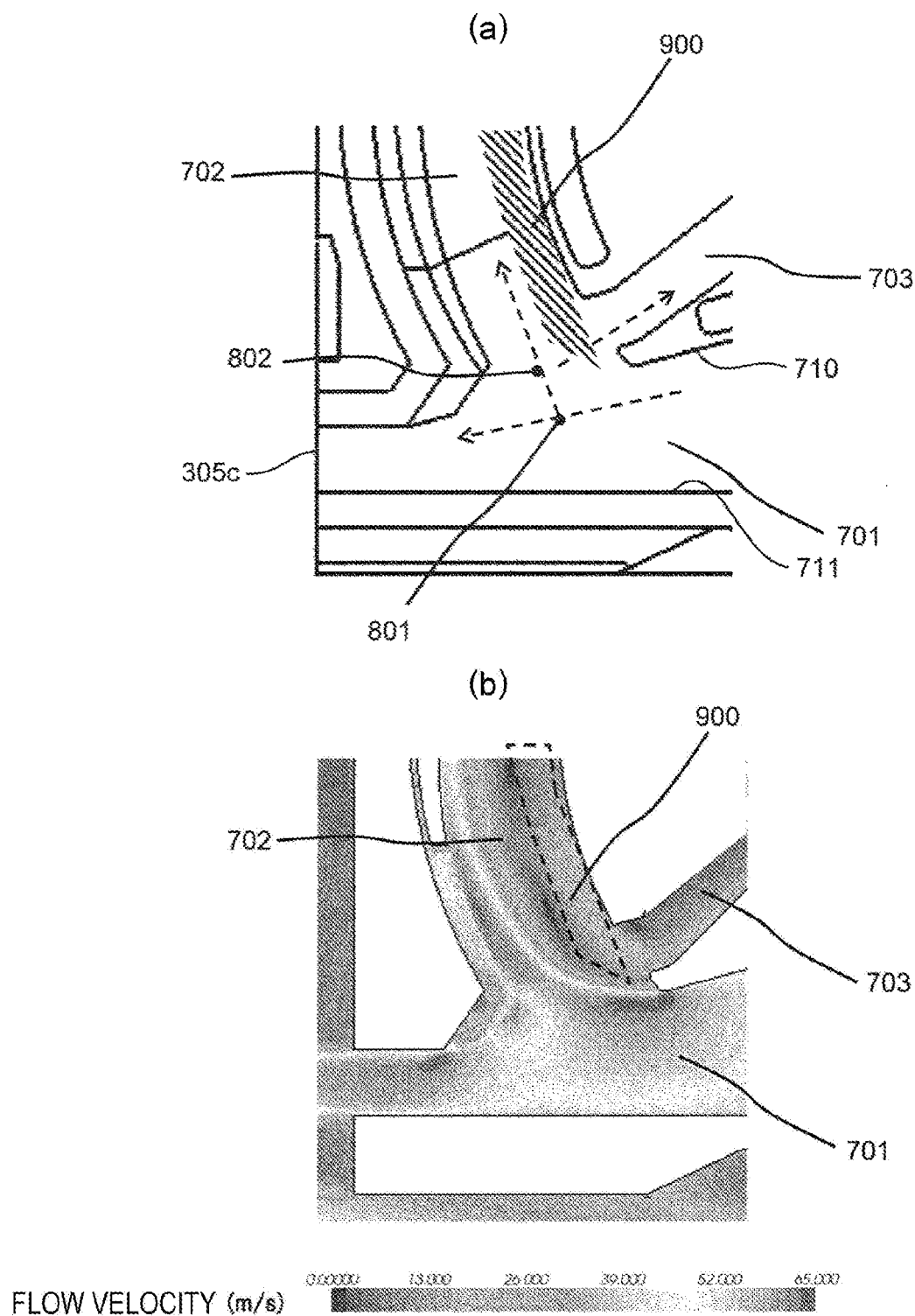
Figure 11:
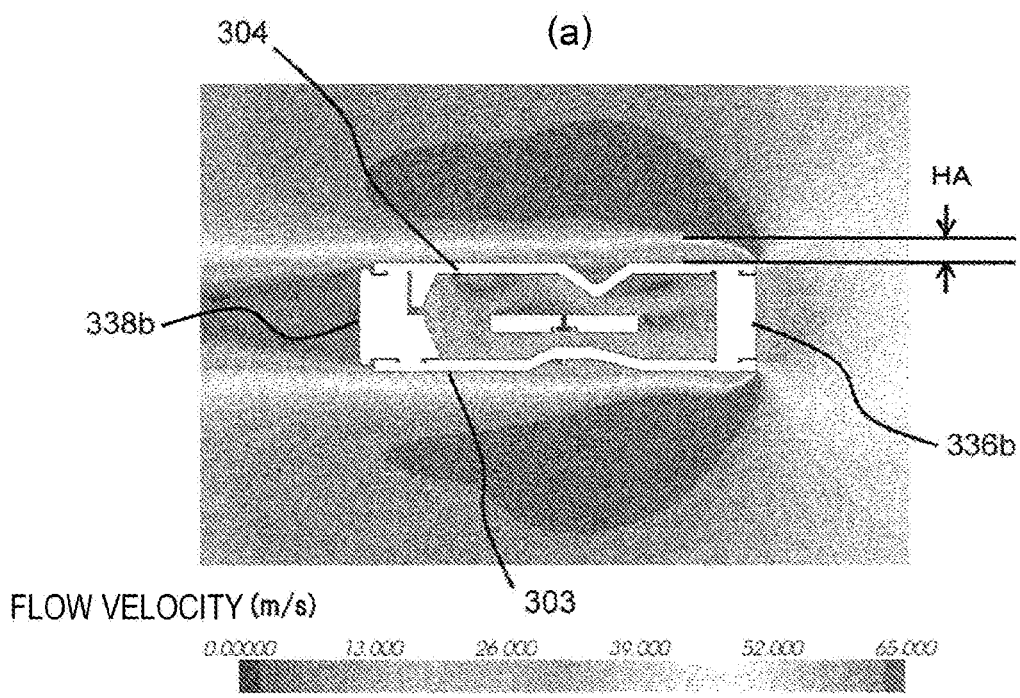
Figure 4:
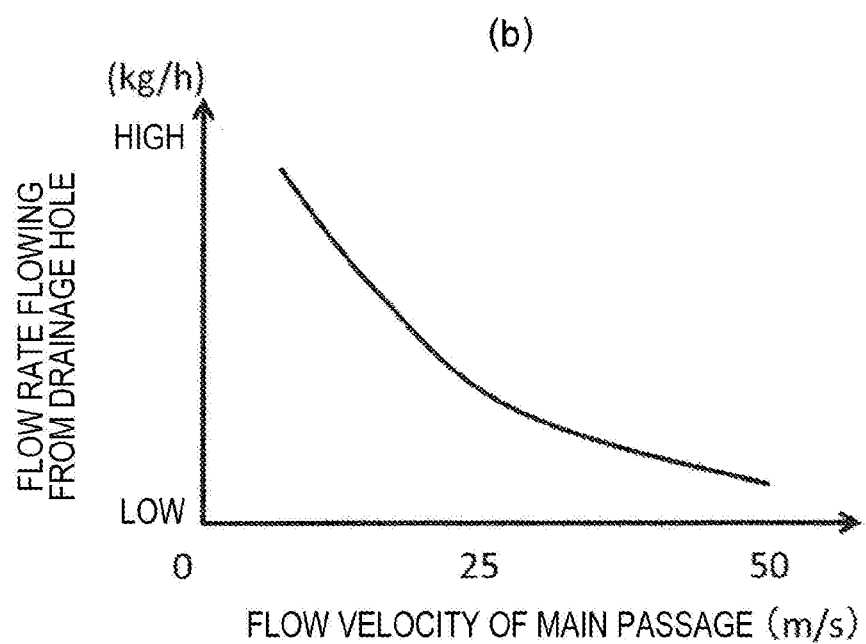
Figures 5, 11:
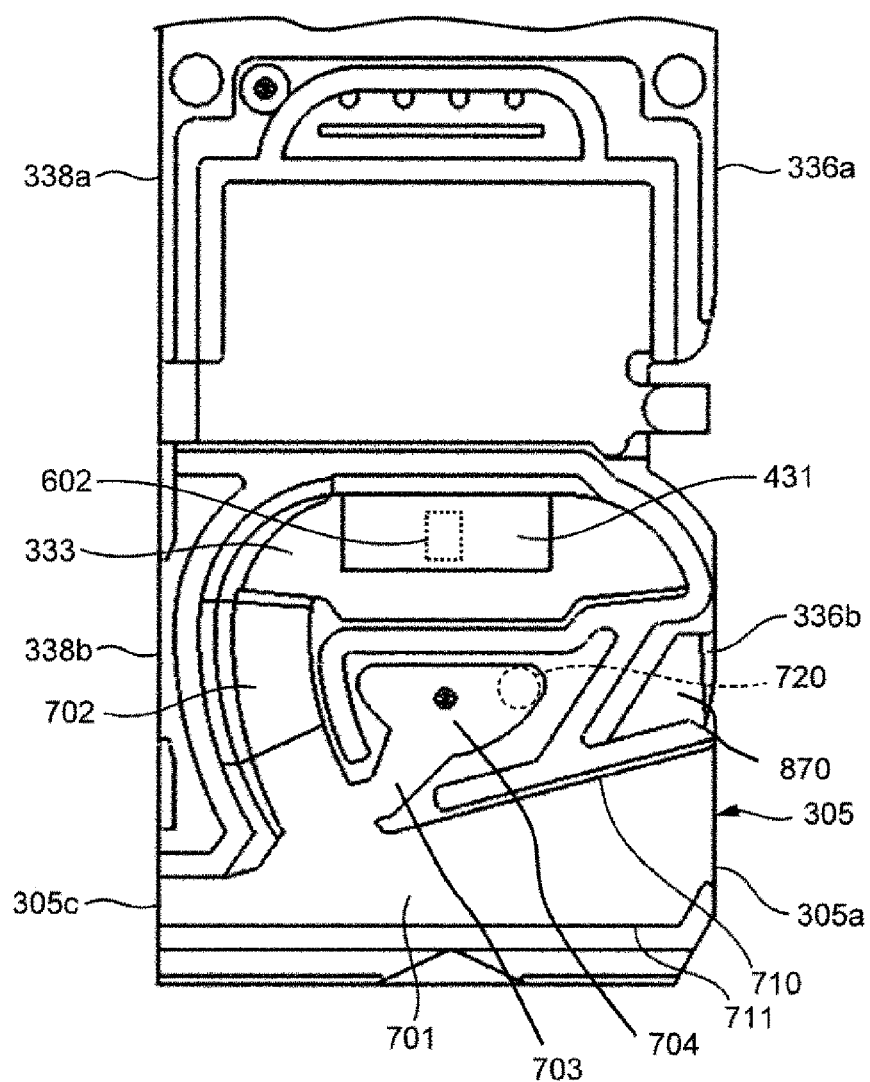
Figure 11:
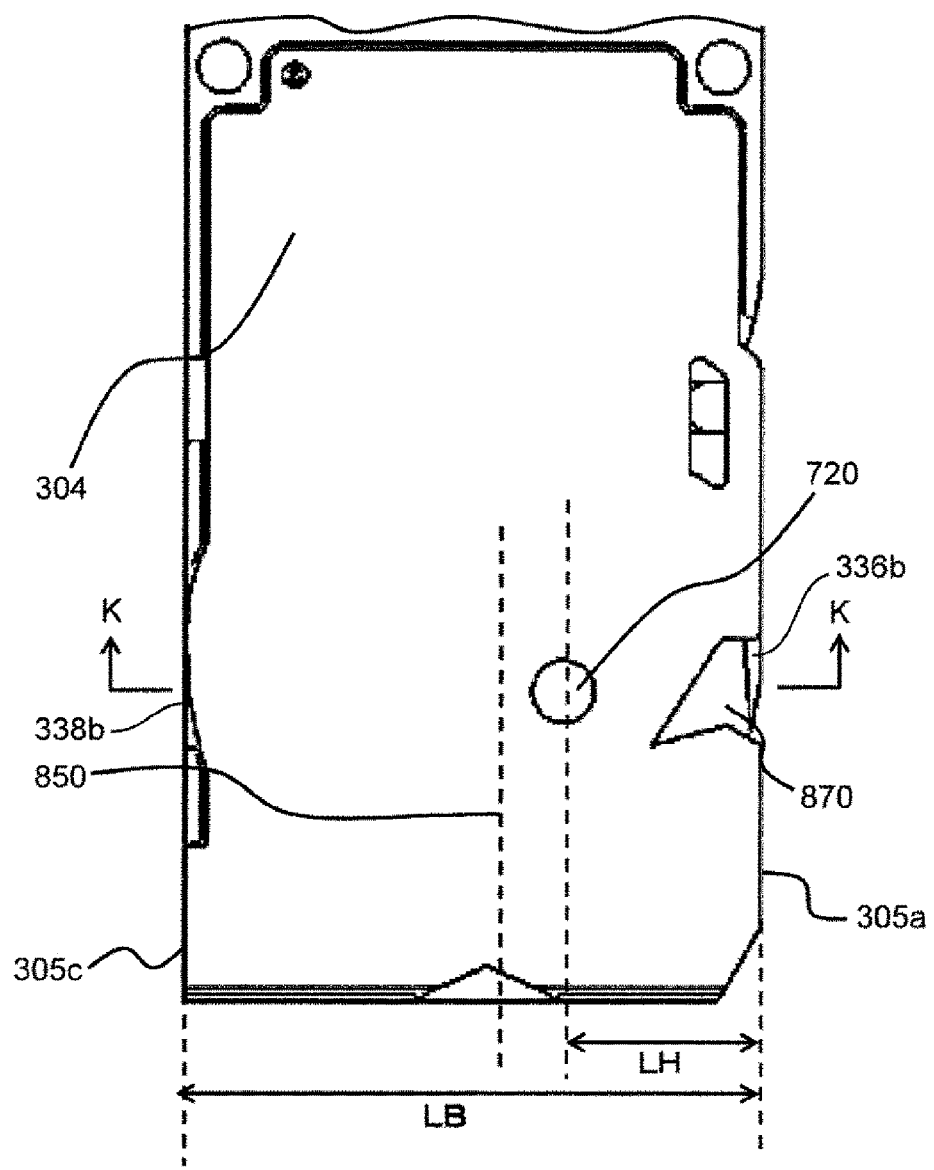
Figure 6:
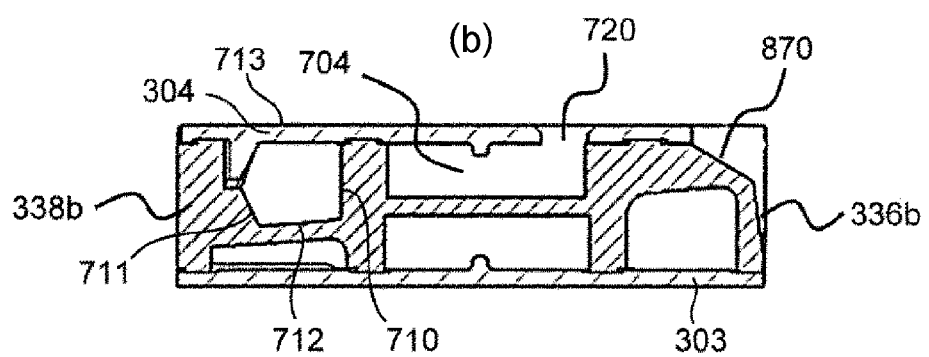
Figures 7, 11:
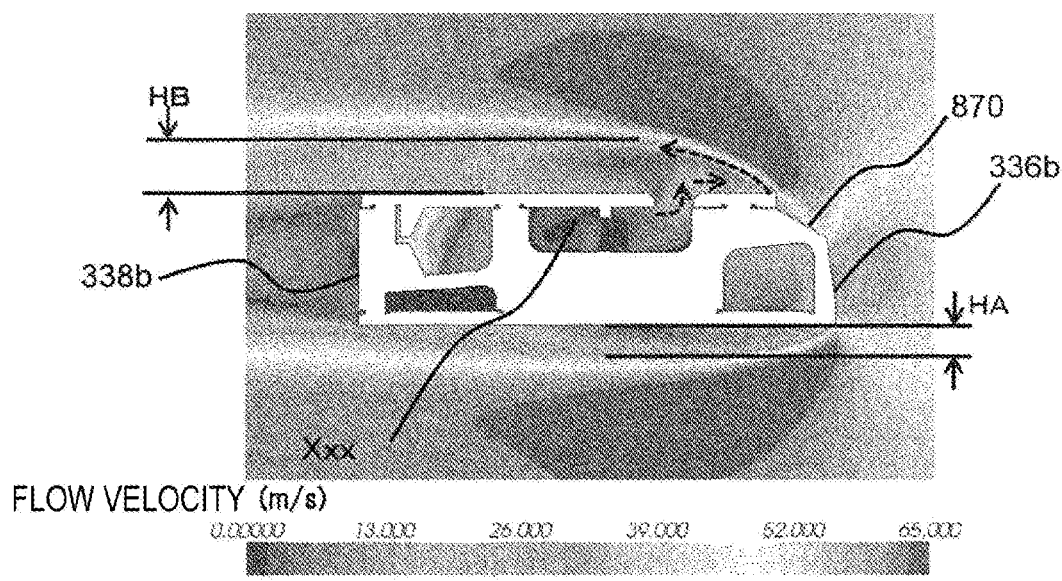
Figures 8, 11:
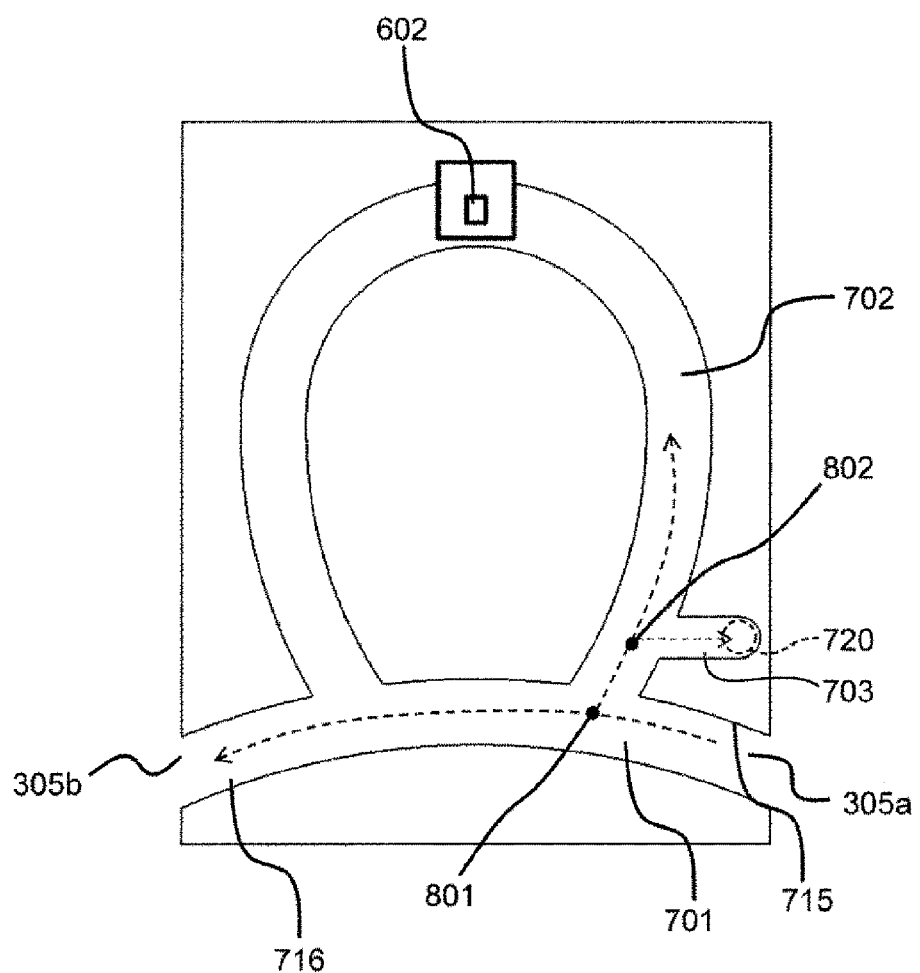

Referring to the enlarged view illustrating the first bifurcation area 801 and the second bifurcation area 802 and the flow velocity profile of FIG. 11-3, the flow velocity decreases in the vicinity of the inner circumferential wall 710 of the second passage 702. In the first bifurcation area 801 having a uniform angle from the first passage, a separated flow is generated, and an end portion of the inner circumferential wall 710 extending from the first passage 701 to the third passage 703 serves as a starting point of the separated flow. For this reason, a low velocity portion 900 is formed at the inner circumferential portion of the separated flow. An inlet portion of the third passage 703 is arranged in a low velocity portion of the separated flow generated in the bifurcation areas of the first passage 701 and the second passage 702. Therefore, the air amount flowing to the third passage 703 is small, and most of the air flows to the second bypass passage 702. As a result, it is possible to suppress degradation of measurement accuracy of the detection area of air flow 602 caused by reduction of the flow velocity.

The discharge port 305c extending straightly from the inlet groove can used to discharge a water droplet or a foreign object contained in the measured gas using inertia of the measured gas 30 if the flow velocity is relatively fast. However, if the flow velocity decreases, the inertial force becomes weak, and its effect is reduced. In particular, a water droplet is easily attached to a wall surface to form a liquid film due to a decrease of the flow velocity of the bypass passage 305 or in a low velocity portion 900 of a delaminated portion generated in the first bifurcation area 701 of the bypass passage 305. As the liquid film grows, the height of the liquid film increases, so that it is transmitted to the wall surface and slowly moves in the air flow direction. In contrast, the inner circumferential wall 710 of the first passage 701 extends to the third passage 703. Therefore, the liquid film flows from the first passage 701 to the third passage 703 and is suppressed from flowing to the second passage 702. Accordingly, it is possible to suppress a decrease of the measurement accuracy in the detection area of air flow 602.

The drainage hole 720 of FIG. 11-2 is an aperture provided in the back side cover 304 and is placed in a terminated end portion of the third passage 703 provided in the groove of bypass passage at back side 334, so as to allow the main passage and the bypass passage 305 to communicate with each other. The outer wall surface at upstream 336b of the bypass passage 305 of FIG. 11-2(b) is perpendicular to the covers 303 and 304 so that a separated flow is generated in the air flow of the main passage 124 as indicated in the flow velocity profile of FIG. 11-4(a). The flow velocity profile of the delaminated portion has a thickness HA gradually thickening from the starting point of delamination along the air flow direction. As a result, a static pressure generated in the upstream of the side surface of the drainage hole 720 is lowered, compared to the static pressure at the terminated end portion of the third passage 703, so as to generate a negative pressure. Therefore, this pressure difference may generate an air flow from the terminated end portion of the third passage 703 via the drainage hole 720. As a result, it is possible to discharge a water droplet (liquid film) flowing to the third passage 702 to the main passage which is the outside. Since the flow velocity is fastest at the starting point of delamination, the negative pressure effect increases as close to the drainage hole 720. For this reason, it is desirable that at least a distance LH from the outer wall surface at upstream 336b of the bypass passage 305 to the drainage hole 720 is set to be equal to or shorter than a half of the distance LB with respect to a center line 850 of a passage width between the outer wall surface at upstream 336b and the outer wall surface at downstream 338b of the bypass passage 305. According to this embodiment, the drainage hole is placed in a distance LH from the outer wall surface at upstream 336b of the housing 302 and is arranged in a position where at least the distance LH is equal to or shorter than a half of the distance LB with respect to the distance LB corresponding to the bypass passage width from the outer wall surface at upstream 336b of the housing 302 to the outer wall surface at downstream 338b.

A relationship between the flow rate flowing from the drainage hole 720 of the physical quantity measurement device having the aforementioned configuration and the flow velocity of the main passage 124 is illustrated in FIG. 11-4(b). This shows that the gas can be effectively discharged from the drainage hole 720 under the condition that the flow velocity of the main passage is low, and a water droplet can easily move on the wall surface by setting the second bifurcation area 702 in the low velocity portion 900 of the inner periphery of delamination. In addition, in the fast flow velocity portion, the flow rate to the third passage 703 is low. Therefore, it is possible to suppress degradation of measurement stability caused by an output fluctuation or the like as the flow velocity at the detection area of air flow 602 is reduced.

FIGS. 11-5 and 11-6 illustrate another embodiment obtained by improving the configuration of FIGS. 11-1 and 11-2. Like reference numerals described in conjunction with FIGS. 11-1 to 11-4 are omitted. In FIG. 11-5, the terminated end hollow portion 704 is formed such that it is expanded from the width of the third passage 703. The physical Quantity measurement device is fixed to the intake body which is the main passage 124 with the flange 311. However, the installation angle is not constant. Therefore, the physical quantity measurement device may be fixed while the aperture of the drainage hole 720 has a direction opposite to a gravity direction. In this case, since a water droplet has a weight, a discharge amount of the water droplet at the flow rate from the drainage hole 720 illustrated in FIG. 11-4(b) is reduced. In the worst case, a water inflow amount intruding to the third passage is larger than a water discharge amount from the drainage hole 720 in some cases. In this case, the drainage hole 720 and the third passage 703 may be clogged, and the water droplet may flow to the second passage 702. In this regard, since the third passage has the terminated end hollow portion 704, it is possible to delay time until the drainage hole 720 or third passage 703 is clogged. Therefore, it is possible to suppress a water droplet from intruding to the detection area of air flow 602.

In FIG. 11-6(*b*), a slope portion 870 is formed on the outer wall at upstream 336*b* of the bypass passage. The slope portion 870 is sloped at an angle set to change a direction of the flow of the measured gas flowing through the main passage 124 to be far from the back side cover 304. The slope portion 870 has an angle set to be close to the drainage hole 720 from the outer wall at upstream 336*b* of the bypass passage, and a notch is provided in the back side cover 304 of the slope portion 870. A flow velocity profile similar to that of FIG. 11-4(*a*) is illustrated in FIG. 11-7. FIG. 11-7 illustrates a flow velocity profile of the cross section K-K of FIG. 11-6(*a*), and it is recognized that the thickness HB of the separated flow becomes thicker than the thickness HA of FIG. 11-4 by adding the slope portion 870. As a result, a pressure of the upper surface of the drainage hole 720 becomes lower than that of the embodiment of FIG. 11-4. In addition, in the cross section K-K of FIG. 11-6(*b*) it is possible to reduce the length LH from the end of the slope portion to the drainage hole 720, which is advantageous. That is, using this configuration, it is possible to improve the negative pressure effect and effectively discharge the water droplet entering the third passage 703.

FIG. 11-8 illustrates an example in which a bypass passage groove having a shape different from that of FIG. 11-1 is formed. The bypass passage 305 is formed by a bypass passage groove of the housing 302 and a cover (not shown) in cooperation. Similarly to the configuration of FIG. 11-1, the bypass passage 305 has a first passage 701, a second passage 702, and a third passage 703. The first passage 701 extends from the inlet 305*a* to the outlet 305*b* while being smoothly curved along the flow direction of the measured gas flowing through the main passage 124. The second passage 702 has a detour shape in which it is bifurcated in the upstream side of the first passage 701 and is joined in the downstream side of the first passage 701. In addition, the detection area of air flow 602 is provided in the middle. The outer circumferential surface 715 of the first passage 701 extends to the second passage 702 via the third passage 703. Even in this configuration, by forming the drainage hole 720 in the cover side surface such that the drainage hole 720 is disposed in the terminated end portion of the third passage 703, it is possible to effectively discharge a water droplet entering the third passage 703.

5. Circuitry of Sensor Device for Physical Quantities 300

5.1 Entirety of Circuitry of Sensor Device for Physical Quantities 300

Figures 1, 10:
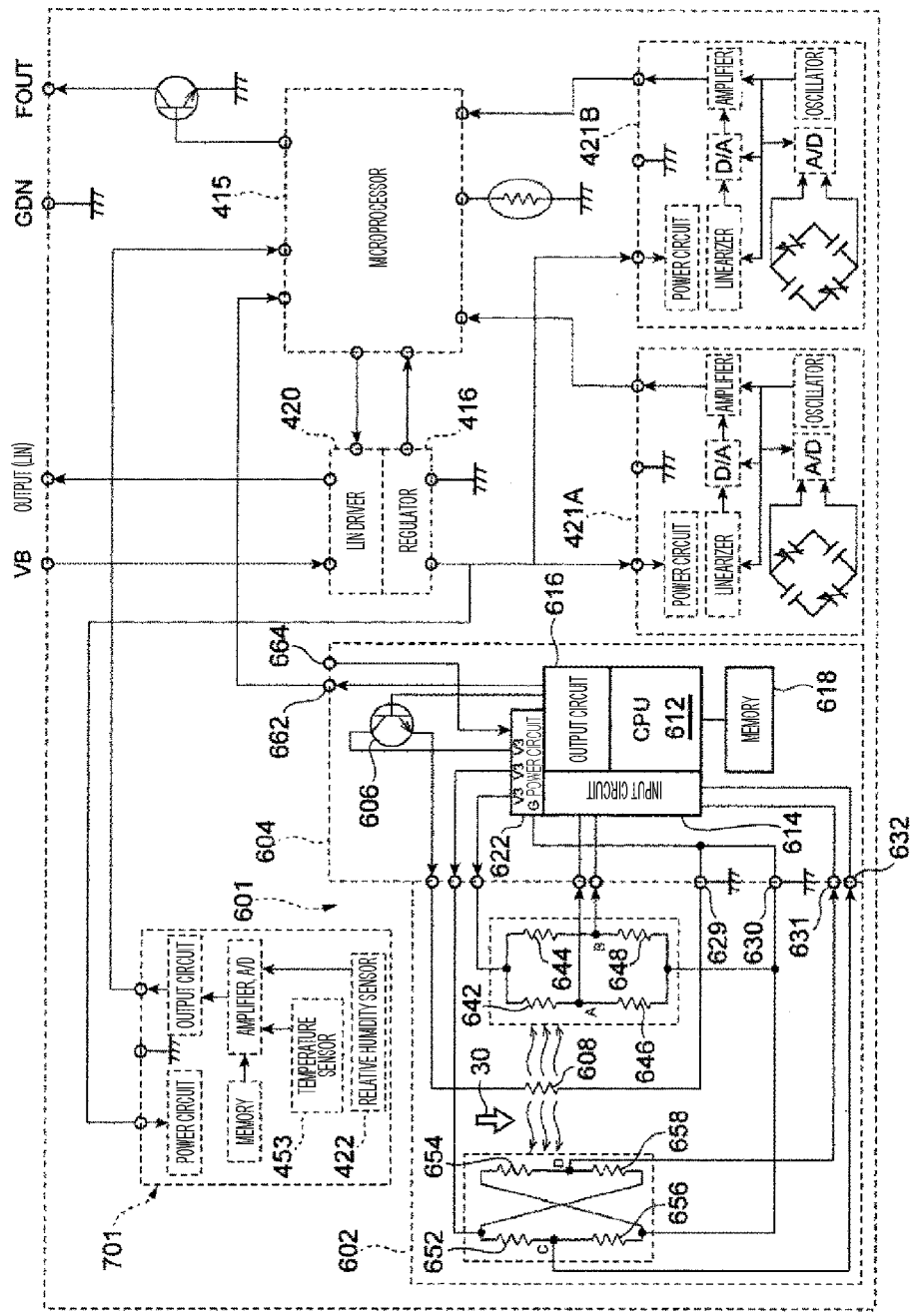
Figures 2, 10:
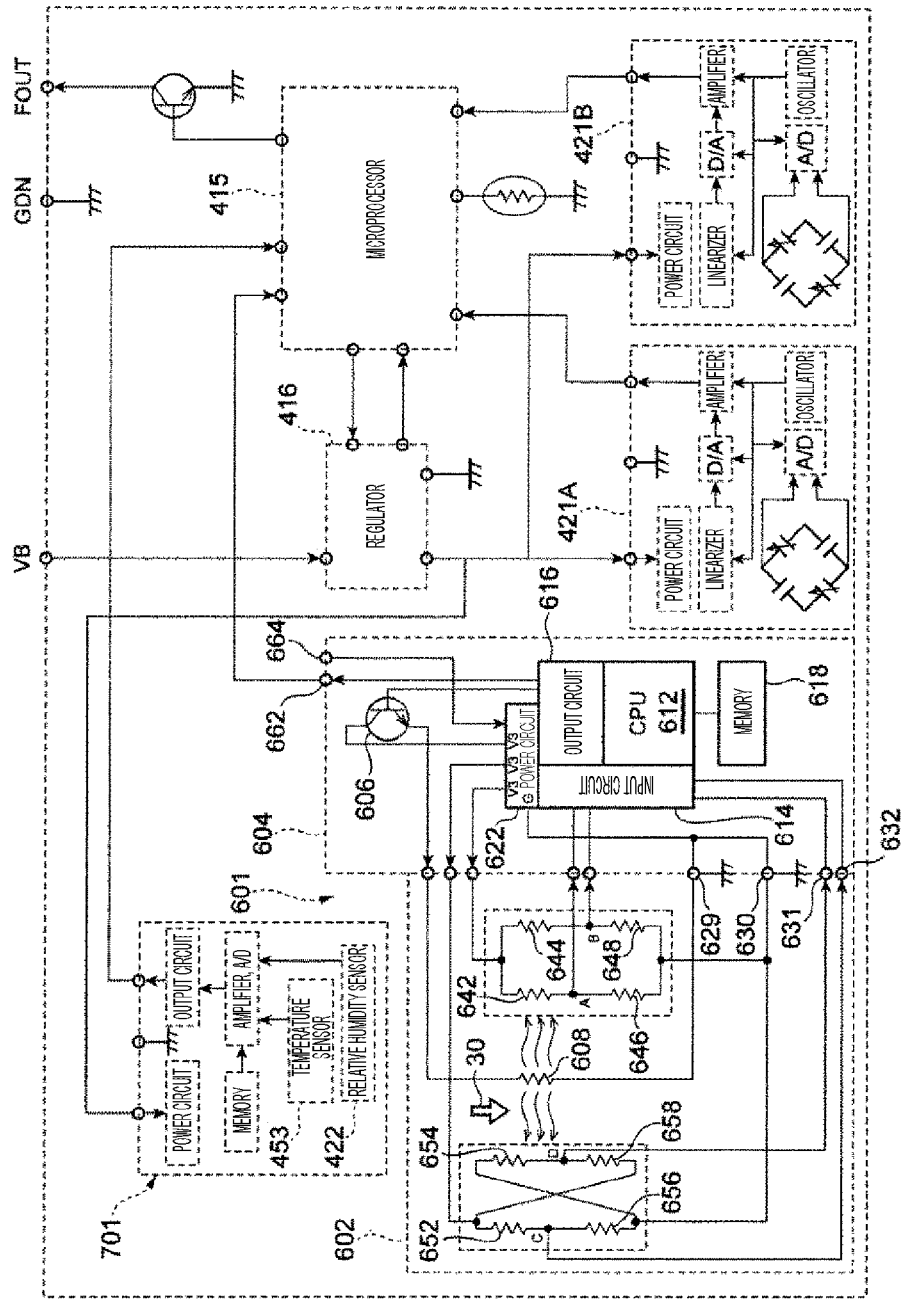

FIG. 10-1 is a circuit diagram illustrating a sensor device for physical quantities 300. The sensor device for physical quantities 300 has a flow rate detection circuit 601 and a temperature and humidity detection circuit 701.

The flow rate detection circuit 601 has a detection area of air flow 602 provided with a heating element 608 and a processing unit 604. The processing unit 604 controls a heat amount generated from the heating element 608 of the detection area of air flow 602 and outputs a signal representing a flow rate based on the output of the detection area of air flow 602 to the microprocessor 415 via the terminal 662. In order to perform the aforementioned process, the processing unit 604 includes a central processing unit (CPU) 612, an input circuit 614, an output circuit 616, a memory 618 that stores data representing a relationship between a correction value or measurement value and the flow rate, and a power circuit 622 that supplies a certain voltage to each of circuits requiring the power. The power circuit 622 is supplied with DC power from an external power source such as a vehicle-mounted battery via a terminal 664 and a ground terminal (not shown).

The detection area of air flow 602 is provided with a heating element 608 for heating the measured gas 30. As a voltage V1 is supplied from the power circuit 622 to a collector of a transistor 606 of a current supply circuit of the heating element 608, and a control signal is applied from the CPU 612 to a base of the transistor 606 via the output circuit 616, an electric current is supplied from the transistor 606 to the heating element 608 via the terminal 624 in response to this control signal. The current amount supplied to the heating element 608 controlled by the control signal applied from the CPU 612 to the transistor 606 included in the current supply circuit of the heating element 608 via the output circuit 616. The processing unit 604 controls the heat amount generated from the heating element 608 such that the temperature of the measured gas 30 increases by a predetermined temperature, for example, 100° C. from its original temperature through heating of the heating element 608.

The detection area of air flow 602 has a heat radiation control bridge 640 for controlling the heat amount generated from the heating element 608 and a flow rate detection bridge 650 for measuring a flow rate. One end of the heat radiation control bridge 640 is supplied with a certain voltage V3 from the power circuit 622 via a terminal 626, and the other end of the heat radiation control bridge 640 is connected to the ground terminal 630. In addition, one end of the flow rate detection bridge 650 is supplied with a certain voltage V2 from the power circuit 622 via a terminal 625, and the other end of the flow rate detection bridge 650 is connected to the ground terminal 630.

The heat radiation control bridge 640 has a resistor 642 which is a resistance thermometer sensor having a resistance value that changes depending on a temperature of the heated measured gas 30, and the resistors 642, 644, 646, and 648 constitute a bridge circuit. A voltage difference between a node A of the resistors 642 and 646 and a node B of the resistors 644 and 648 is input to the input circuit 614 via the terminals 627 and 628, and the CPU 612 controls the current supplied from the transistor 606 such that the voltage difference between the nodes A and B becomes a predetermined value, for example, zero voltages in this embodiment in order to control the heat amount generated from the heating element 608. The flow rate detection circuit 601 of FIG. 10-1 heats the measured gas 30 using the heating element 608 such that the temperature of the measured gas 30 is higher than the original temperature of the measured gas 30 by a certain temperature, for example, 100° C. at all times. In order to perform this heating control with high accuracy, resistance values of resistors of the heat radiation control bridge 640 are set such that a voltage difference between the nodes A and B becomes zero voltages when the temperature of the measured gas 30 heated by the heating element 608 becomes higher than the initial temperature by a certain temperature, for example, 100° C. at all times. Therefore, in the flow rate detection circuit 601, the CPU 612 controls the current supplied to the heating element 608 such that the voltage difference between the nodes A and B becomes zero voltages.

The flow rate detection bridge 650 includes four resistance thermometer sensors, that is, resistors 652, 654, 656, and 658. The four resistance thermometer sensors are arranged along the flow of the measured gas 30, and the resistors 652 and 654 are arranged in the upstream side in the flow path of the measured gas 30 with respect to the heating element 608. In addition, the resistors 656 and 658 are arranged in the downstream side in the flow path of the measured gas 30 with respect to the heating element 608. Furthermore, in order to improve the measurement accuracy, the resistors 652 and 654 are arranged to have substantially the same distance to the heating element 608, and the resistors 656 and 658 are arranged to have substantially the same distance to the heating element 608.

A voltage difference between the node C of the resistors 652 and 656 and the node D of the resistors 654 and 658 is input to the input circuit 614 via terminals 631 and 632. In order to improve measurement accuracy, each resistor of the flow rate detection bridge 650 is set such that the voltage difference between the nodes C and D becomes zero, for example, while the flow of the measured gas 30 has a zero state. Therefore, while the voltage difference between the nodes C and D has, for example, a zero voltage state, the CPU 612 outputs an electric signal representing that the flow rate of the main passage 124 is zero from the terminal 662 on the basis of the measurement result representing that the flow rate of the measured gas 30 is zero.

If the measured gas 30 flows in the arrow direction in FIG. 10-1, the resistor 652 or 654 arranged in the upstream side is cooled by the measured gas 30, the resistors 656 and 658 arranged in the downstream side of the measured gas 30 are heated by the measured gas 30 heated by the heating element 608, so that temperatures of the resistors 656 and 658 increase. For this reason, a voltage difference is generated between the nodes C and D of the flow rate detection bridge 650, and this voltage difference is input to the input circuit 614 via the terminals 631 and 632. The CPU 612 searches data representing a relationship between the voltage difference and the flow rate of the main passage 124 stored in the memory 618 on the basis of the voltage difference between the nodes C and D of the flow rate detection bridge 650 and obtains the flow rate of the main passage 124. The electric signal representing the flow rate of the main passage 124 obtained in this manner is output via the terminal 662. Note that, although the terminals 664 and 662 of FIG. 10-1 are denoted by new reference numerals, they are also included in the connection terminal 412 described above.

The memory 618 stores data representing a relationship between the voltage difference between the nodes C and D and the flow rate of the main passage 124. Furthermore, the memory 618 stores correction data for reducing a measurement error such as a deviation obtained on the basis of an actual measurement value of the gas after manufacturing of the printed circuit board (PWB) 400.

The temperature and humidity detection circuit 701 has an input circuit such as an amplifier or A/D that receives detection signals from the temperature sensor 453 and the humidity sensor 422, an output circuit, a memory that stores data representing a relationship between a correction value or temperature and absolute humidity, and a power circuit 622 that supplies a constant voltage to each circuit requiring the power. The signals output from the flow rate detection circuit 601 and the temperature and humidity detection circuit 701 are input to the microprocessor 415. The microprocessor 415 has a flow rate computation unit, a temperature computation unit, and an absolute humidity computation unit to compute physical quantities such as a flow rate, temperature, and absolute humidity of the measured gas 30 on the basis of the signals and output them to the ECU 200.

The sensor device for physical quantities 300 and the ECU 200 are connected to each other via a communication cable, so that digital signal communication is performed on the basis of a communication standard such as SENT, LIN, and CAN. In this embodiment, a signal is input to a LIN driver 420 from the microprocessor 415, and LIN communication is performed from the LIN driver 420. Information output from the LIN driver of the sensor device for physical quantities 300 to the ECU 200 is output in a duplicated manner using digital communication via one or two communication cables.

The absolute humidity computation unit of the microprocessor 415 performs a process of computing absolute humidity on the basis of the relative humidity information output from the humidity sensor 422 and temperature information and correcting the absolute humidity on the basis of an error. The corrected absolute humidity computed by the absolute humidity computation unit is used in various engine driving control operations of the control unit 62 of the ECU 18. In addition, the ECU 18 may directly use comprehensive error information in various engine driving control operations.

Note that, although the sensor device for physical quantities 300 has the LIN driver 420 to perform LIN communication in the aforementioned embodiments of FIG. 11, the invention is not limited thereto. Alternatively, the sensor device for physical quantities 300 may directly communicate with the microprocessor 415 without using the LIN communication as illustrated in FIG. 10-2.

While the embodiments of the present invention have been described in details hereinbefore, the invention is not limited to such embodiments. Instead, various design changes may be possible without departing from the spirit and scope of the invention as appended in the claims. For example, the aforementioned embodiments have been described specifically in order to facilitate understanding, and they are not limited to a case where all of the components described above are provided. A part of the configuration of any embodiment may be substituted with a part of the other embodiment, and a part of the configuration of the other embodiment may also be added to a configuration of any embodiment. Furthermore, any addition, deletion, or substitution may be possible for a part of the configuration of each embodiment.

REFERENCE SIGNS LIST 30 measured gas
124 main passage
300 sensor device for physical quantities
302 housing
305 first bypass passage
336 outer wall at upstream
336a circuit room outer wall at upstream
336b bypass passage outer wall at upstream
338 outer wall at downstream
338a circuit room outer wall at downstream
338b bypass passage outer wall at downstream
400 printed circuit board (PWB)
421A, 421B pressure sensor (third detection portion)
422 humidity sensor (second detection portion)
602 detection area of air flow (first detection portion)
701 first passage 702 second passage
703 third passage
704 hollow portion at the end of a third passage
710 inner periphery of a bypass passage groove at back side
711 outer periphery of a bypass passage groove at back side
712 wall surface of cover
713 wall surface of a bypass passage groove at back side
720 drainage hole
801 first bifurcation area
802 second bifurcation area
850 center line of a bypass passage width
870 slope area of outer wall at upstream

The invention claimed is:

1. A sensor device for physical quantities comprising:
at least a detection portion configured to detect a physical quantity of a measured gas passing through a main passage and has a detection area of air flow;
a printed circuit board (PWB) having a circuit portion for computing the physical quantity detected by the detection portion;
a housing configured house the printed circuit board;
a cover fixed to the housing; and
a bypass passage formed in cooperation with the housing and the cover,
wherein the detection area of air flow is disposed in the bypass passage;
the sensor device characterized in that
the bypass passage has a first passage that allows an inlet for receiving the measured gas and an outlet for discharging the measured gas to communicate with each other, a second passage bifurcated from the first passage, and a third passage bifurcated from the second passage,
wherein the third passage is formed to extend toward an outerwall surface upstream of the housing and have a terminated end portion having a surface facing an air flow direction and an inlet portion of the third passage is arranged upstream of the second passage flowing to the detection area of air flow.

2. The sensor device for physical quantities according to claim 1, wherein the second passage has a curvature, and the detection area of air flow is disposed in the second passage.

3. The sensor device for physical quantities according to claim 1, wherein the cover has a drainage hole opened to a side surface of the cover, and the drainage hole is provided in a position communicating with the terminated end portion of the third passage.

4. The sensor device for physical quantities according to claim 3, wherein the drainage hole is positioned in a distance LH from the outer wall surface at upstream of the housing, the distance LH being at least set to be equal to or smaller than a half of a distance LB corresponding to a bypass passage width from the outer wall surface at upstream to the outer wall surface at downstream of the housing.

5. The sensor device for physical quantities according to claim 3, wherein the inlet portion of the third passage is disposed in a low velocity portion of a separated flow generated from a bifurcation area between the first and second passages.

6. The sensor device for physical quantities according to claim 4, wherein a hollow portion having a width larger than a passage width of the inlet portion is provided between the inlet portion and the terminated end portion of the third passage.

7. The sensor device for physical quantities according to claim 3, wherein the housing has an outer wall surface in an upstream side of a main flow of the measured gas with respect to the drainage hole, the outer wall surface has a slope portion for changing a direction of the flow of the measured gas, and the slope portion is sloped at an angle set to change a direction of the flow of the measured gas to be apart from the side surface of the cover.

* * * * *